United States Patent
Ramakrishnan et al.

(10) Patent No.: US 12,436,103 B2
(45) Date of Patent: Oct. 7, 2025

(54) ATTENUATED TOTAL REFLECTION BASED MEASUREMENT OF REFRACTIVE INDEX AND CARBON DIOXIDE CONCENTRATION

(71) Applicant: Schlumberger Technology Corporation, Sugar Land, TX (US)

(72) Inventors: Terizhandur S. Ramakrishnan, Boxborough, MA (US); Robert O'Leary, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 258 days.

(21) Appl. No.: 18/178,085

(22) Filed: Mar. 3, 2023

(65) Prior Publication Data

US 2023/0304928 A1   Sep. 28, 2023

Related U.S. Application Data

(60) Provisional application No. 63/269,882, filed on Mar. 24, 2022.

(51) Int. Cl.
  *G01N 21/41* (2006.01)
  *E21B 49/08* (2006.01)
  *G01N 33/28* (2006.01)

(52) U.S. Cl.
  CPC ............ *G01N 21/41* (2013.01); *E21B 49/081* (2013.01); *G01N 33/2823* (2013.01); *G01N 33/2841* (2013.01); *G01N 2201/0638* (2013.01)

(58) Field of Classification Search
  CPC ............... G01N 21/41; G01N 33/2823; G01N 33/2841; G01N 2201/0638;
  (Continued)

(56) References Cited

U.S. PATENT DOCUMENTS

| 1,968,202 A | 7/1934 | Gerhard |
| 7,134,500 B2 | 11/2006 | Ramakrishnan |

(Continued)

FOREIGN PATENT DOCUMENTS

| CA | 3028735 A1 * | 1/2018 | ........... E21B 47/102 |
| CN | 1836155 A * | 9/2006 | ........... E21B 47/102 |

(Continued)

OTHER PUBLICATIONS

International Search Report and Written Opinion issued in the PCT Application No. PCT/US2023/014465 dated Jun. 29, 2023, 12 pages.

(Continued)

*Primary Examiner* — Mohamed K Amara
(74) *Attorney, Agent, or Firm* — Jeffrey D. Frantz

(57) ABSTRACT

Systems and methods presented herein generally relate to a tool for determining a refractive index of a formation fluid using attenuated total reflection. The tool includes a body having a fluid admitting assembly and a flow line that receives the formation fluid. The tool also includes two different crystals having faces in contact with fluid in the flow line. The tool further includes at least one light source coupled to the crystals and configured to direct light into the crystals. In addition, the wavelength, the refractive indices, and the angles of incidence are configured such that the light undergoes total internal reflection at interfaces between the crystals and the formation fluid. The tool also includes at least one light detector coupled to the crystals and configured to measure reflected light exiting the crystals. The tool further includes at least one processor coupled to the at least one light detector.

20 Claims, 17 Drawing Sheets

(58) Field of Classification Search
CPC .... G01N 21/4133; G01N 21/65; G01N 33/24;
G01N 33/241; E21B 49/081; E21B
49/0875; E21B 49/10; E21B 17/1078;
E21B 47/01; E21B 47/017; E21B
47/0175; E21B 49/00; G01J 3/0286; G01J
3/0291; G01J 3/18; G01J 3/44; G01J
3/4412; G01J 3/0264; G01J 2003/1208;
G01V 8/02
See application file for complete search history.

(56) References Cited

U.S. PATENT DOCUMENTS

| | | | |
|---|---|---|---|
| 8,099,241 | B2 | 1/2012 | Niu et al. |
| 9,500,583 | B2 | 11/2016 | Jiang |
| 2010/0025112 | A1 | 2/2010 | Sroka et al. |
| 2010/0230154 | A1* | 9/2010 | Naito .................. H05K 9/0092 156/150 |
| 2012/0290208 | A1 | 11/2012 | Jiang et al. |
| 2014/0300889 | A1 | 10/2014 | DiFoggio et al. |
| 2017/0187159 | A1* | 6/2017 | Busch ................ H01S 3/06708 |
| 2017/0242149 | A1 | 8/2017 | Fujisawa |
| 2019/0079007 | A1* | 3/2019 | Sharma .................. G01N 21/41 |
| 2020/0292877 | A1* | 9/2020 | Nakamura ........ G02F 1/133302 |
| 2022/0026355 | A1* | 1/2022 | Normand .............. G01J 3/0229 |
| 2023/0339852 | A1* | 10/2023 | Armstrong .............. C09C 1/407 |
| 2024/0077762 | A1* | 3/2024 | Tu ..................... G02F 1/133502 |

FOREIGN PATENT DOCUMENTS

| | | | | |
|---|---|---|---|---|
| CN | 108738344 | A * | 11/2018 | .............. G01J 1/429 |
| CN | 110987806 | A * | 4/2020 | .............. G01N 21/01 |
| WO | WO-2008090186 | A1 * | 7/2008 | ......... G01N 21/4133 |

OTHER PUBLICATIONS

Smits et al., In-situ optical fluid analysis as an aid to wireline formation sampling. SPE Formation Evaluation, 10(2):91-98, 1995.
Crombie et al., Innovations in wireline fluid sampling. Schlumberger Oilfield Review, 10(3):26-41, 1998.
Morris et al., Using optical fluid analysis to evaluate downhole fluid sample contamination. In Proc. of European Petroleum Conference. Society of Petroleum Engineers, 1998 (13 pages).
Poulter et al., The effect of pressure on the index of refraction of paraffin oil and glycerine. Phys. Rev., 41:366-367, 1932.
Dubey et al., Refractive index of ternary liquid systems of squalane(+ hexane+ benzene;+ cyclohexane+ benzene and+ hexane+ cyclohexane). Indian J. of Pure and Applied Phys., 43(3):175-179, 2005.
Khosrokhavar et al., Visualization and investigation of natural convection flow of CO2 in aqueous and oleic systems. Journal of Petroleum Science and Engineering, 122:230-239, 2014.
Tilton et al., Refractive index measurement. In Walter G. Berl, editor, Physical Methods in Chemical Analysis, 2nd ed. vol. I, pp. 412-462. Academic Press, New York, 1960.
Bauer et al., Refractormetry. In Arnold Weissberger, editor, Physical Methods of Organic Chemistry, 2nd ed. vol. II, pp. 1141-1240. Academic Press, New York, 1949.
Duan et al., An improved model calculating co2 solubility in pure water and aqueous nacl solutions from 273 to 533 k and from 0 to 2000 bar. Chemical geology, 193(3-4):257-271, 2003.
Shumate, An interferometric measurement of index of refraction. Master's thesis, California Institute of Technology, Pasadena, California, 3 1964. M. S. thesis. (75 pages).
International Preliminary Report on Patentability issued in the PCT Application No. PCT/US2023/014465 dated Oct. 3, 2024, 8 pages.

* cited by examiner

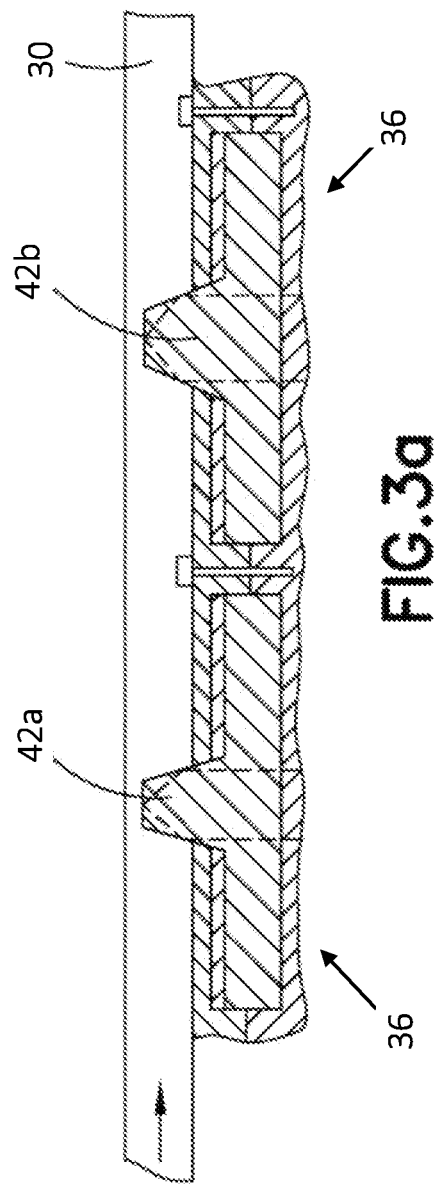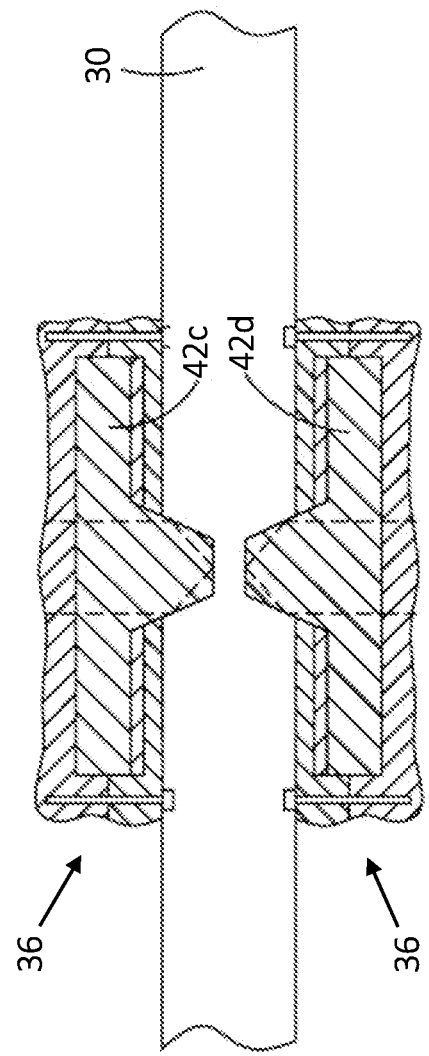

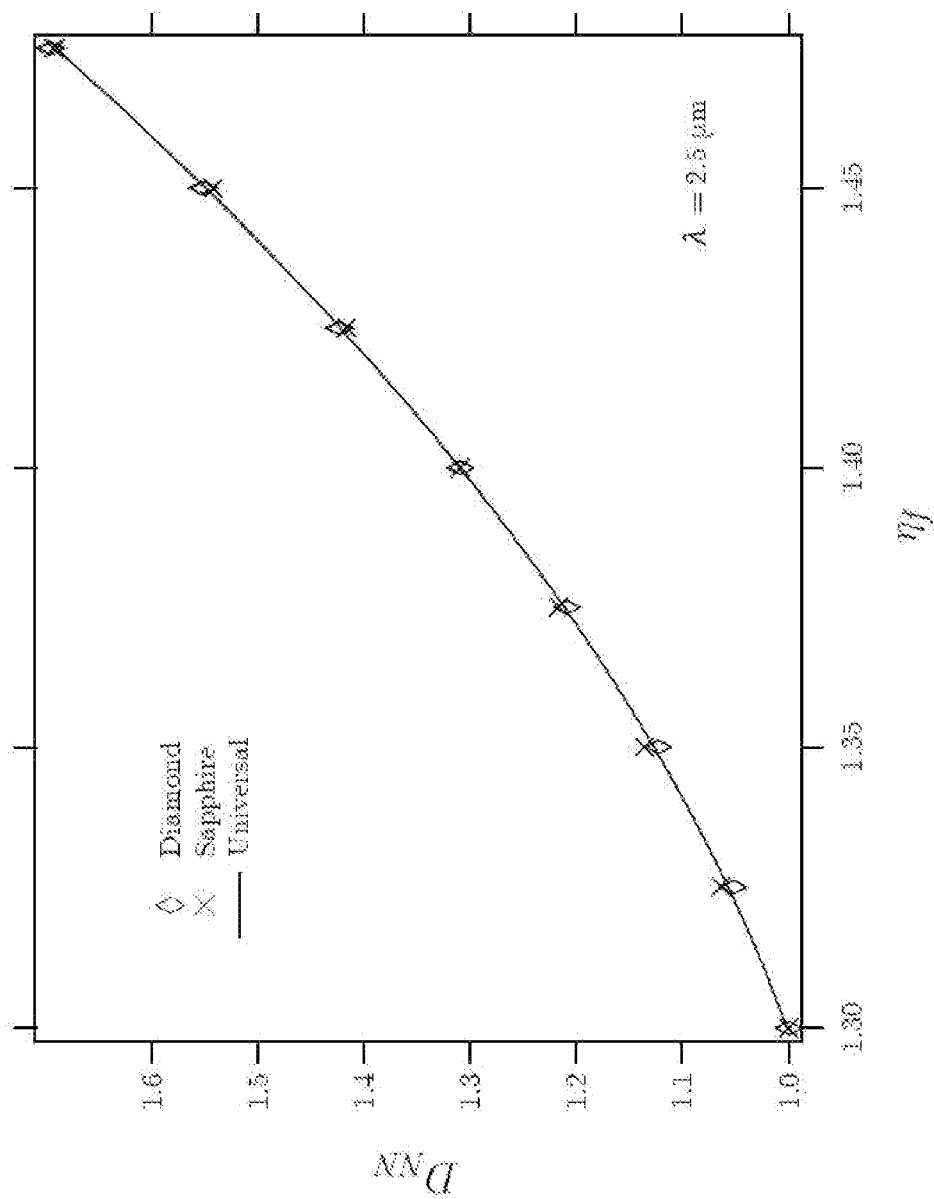
FIG. 4: A plot of $D_{NN}$ at 2.5 μm wavelength shows that the double normalized path length can be represented as a function of $\eta_f$ alone. $\theta = 65, 70,$ and $75°$ have nearly overlapping points, and cannot be easily distinguished. The value of $F$ in this plot is 0.98.

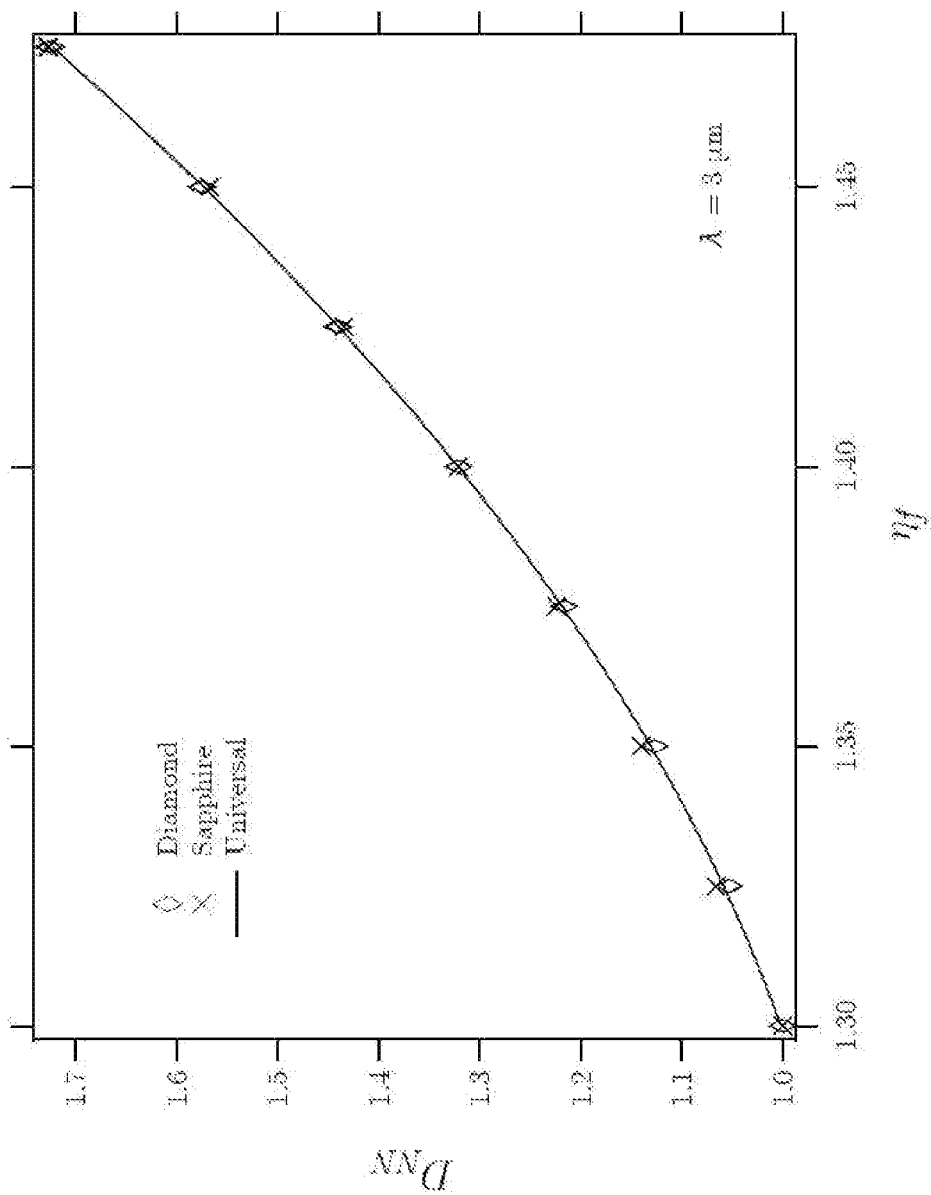
FIG. 5: $D_{NN}$ at 3 µm wavelength shows that the main dependence is with respect to $\eta_f$ alone. $\theta = 65, 70,$ and $75°$ are included in the plot for both diamond and sapphire. $F = 0.99$.

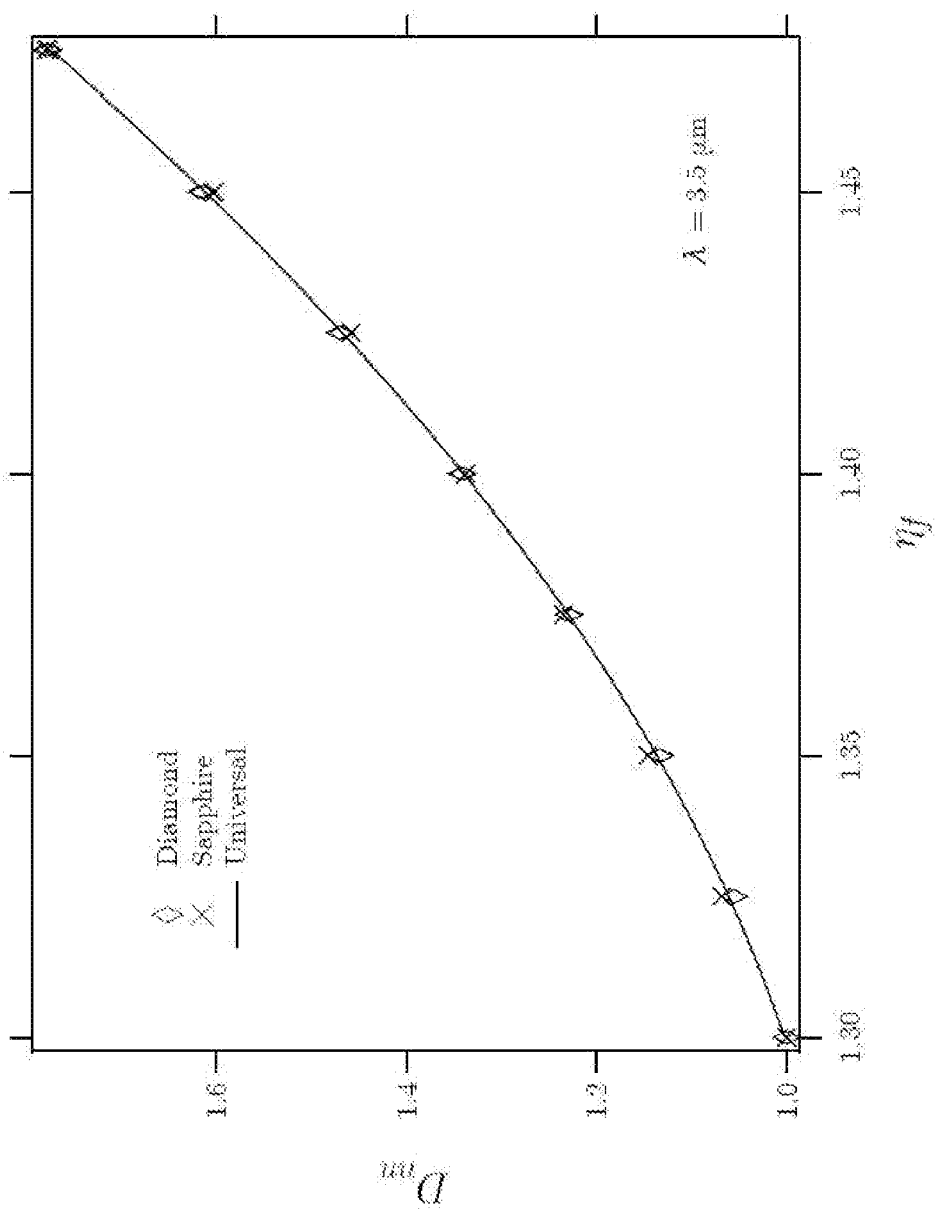
FIG. 6: $D_{NN}$ at 3.5 μm wavelength. $\theta = 65, 70,$ and $75°$ are included in the plot for both diamond and sapphire. $F = 1.01$.

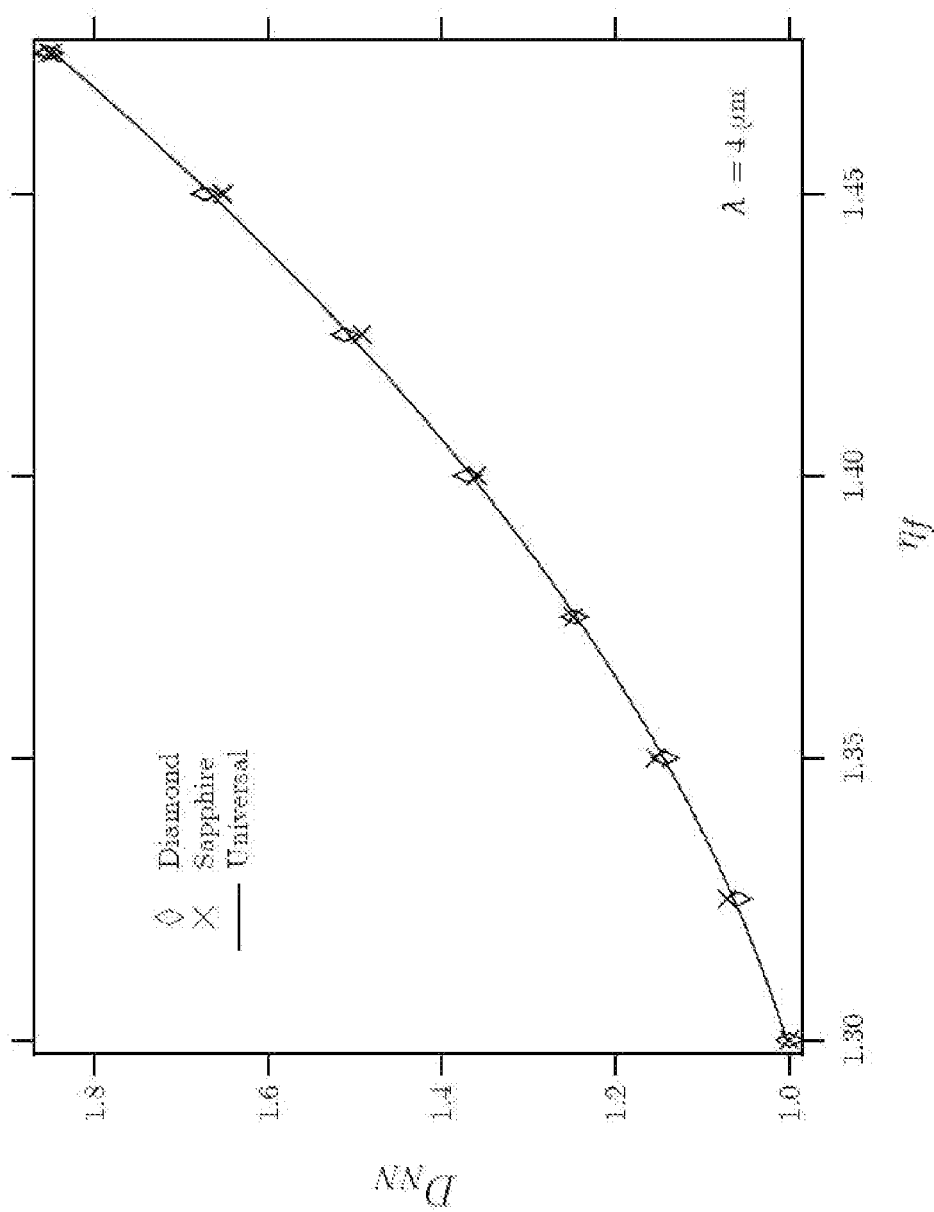
FIG. 7: $D_{NN}$ at 4μm wavelength. $\theta = 65, 70,$ and $75°$ are included in the plot for both diamond and sapphire. $F = 1.04$.

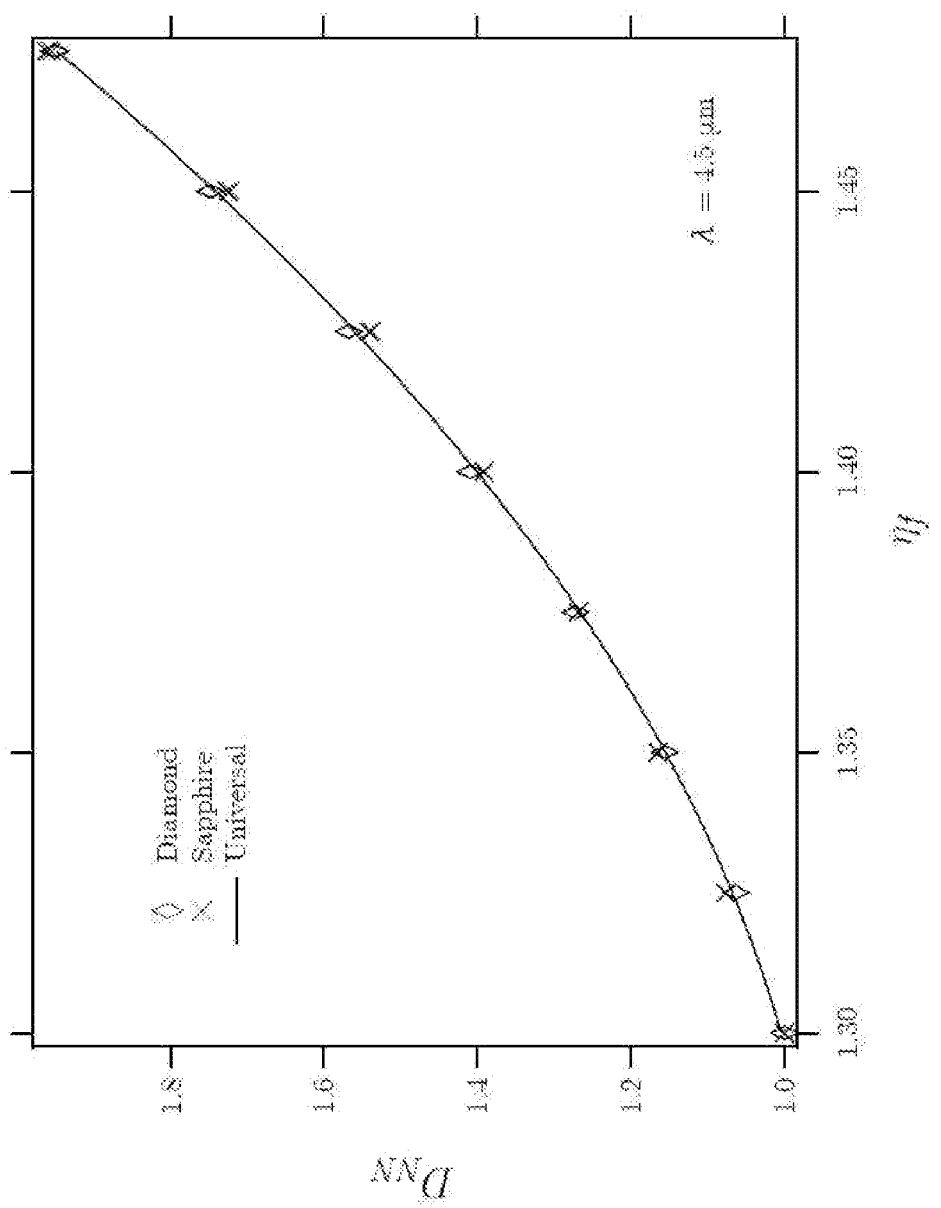
FIG. 8: $D_{NN}$ at a wavelength of 4.5 μm for crystal angles of $\theta = 65, 70,$ and $75°$, $F = 1.08$.

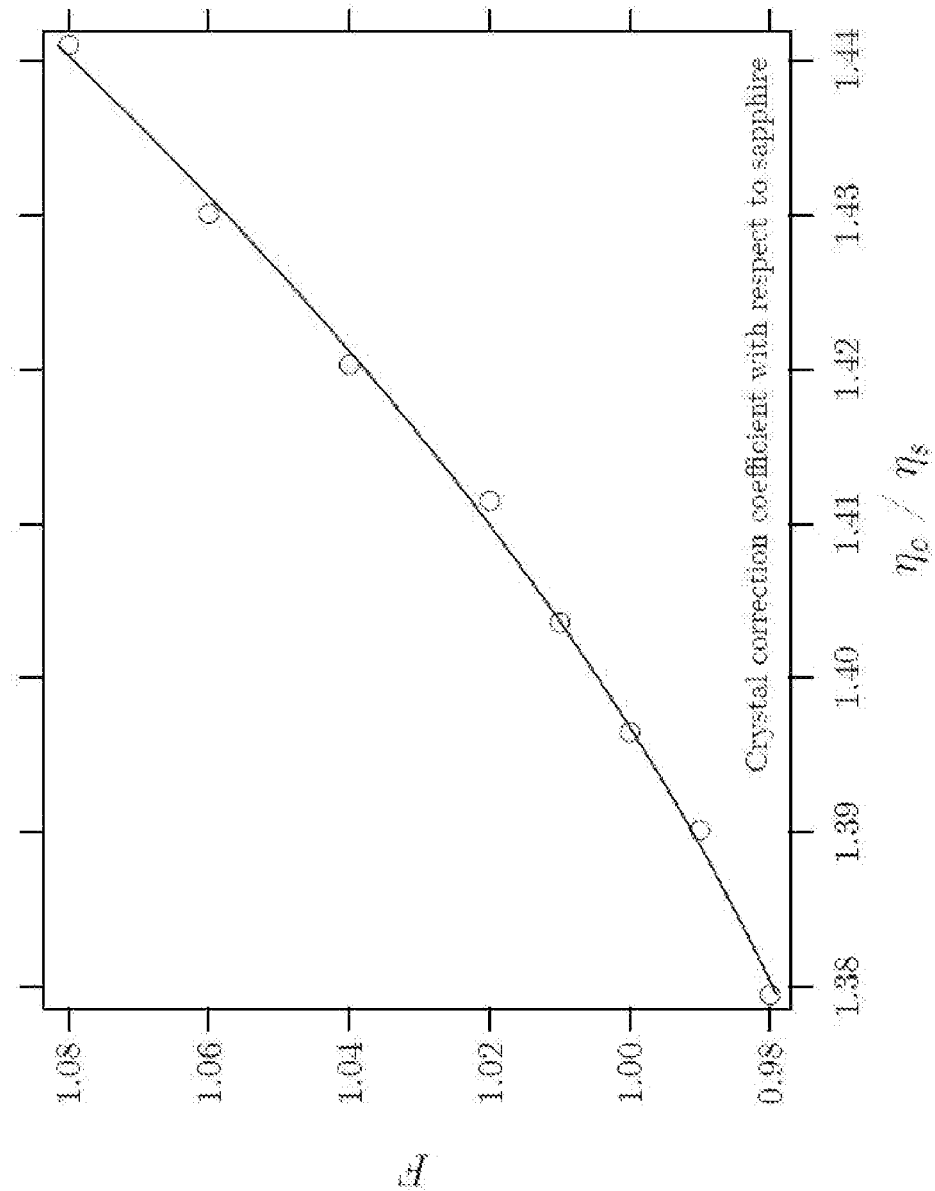
FIG. 9: Function $F(\eta_c/\eta_s) \approx 1$. Variation of $F$ around unity allows for a more generalized correction for computing $\eta_{fs}$ than $F = 1$ assumed previously. The solid curve is a least squares fit through the $F$ values used in the least square fits of $D_{NN}$.

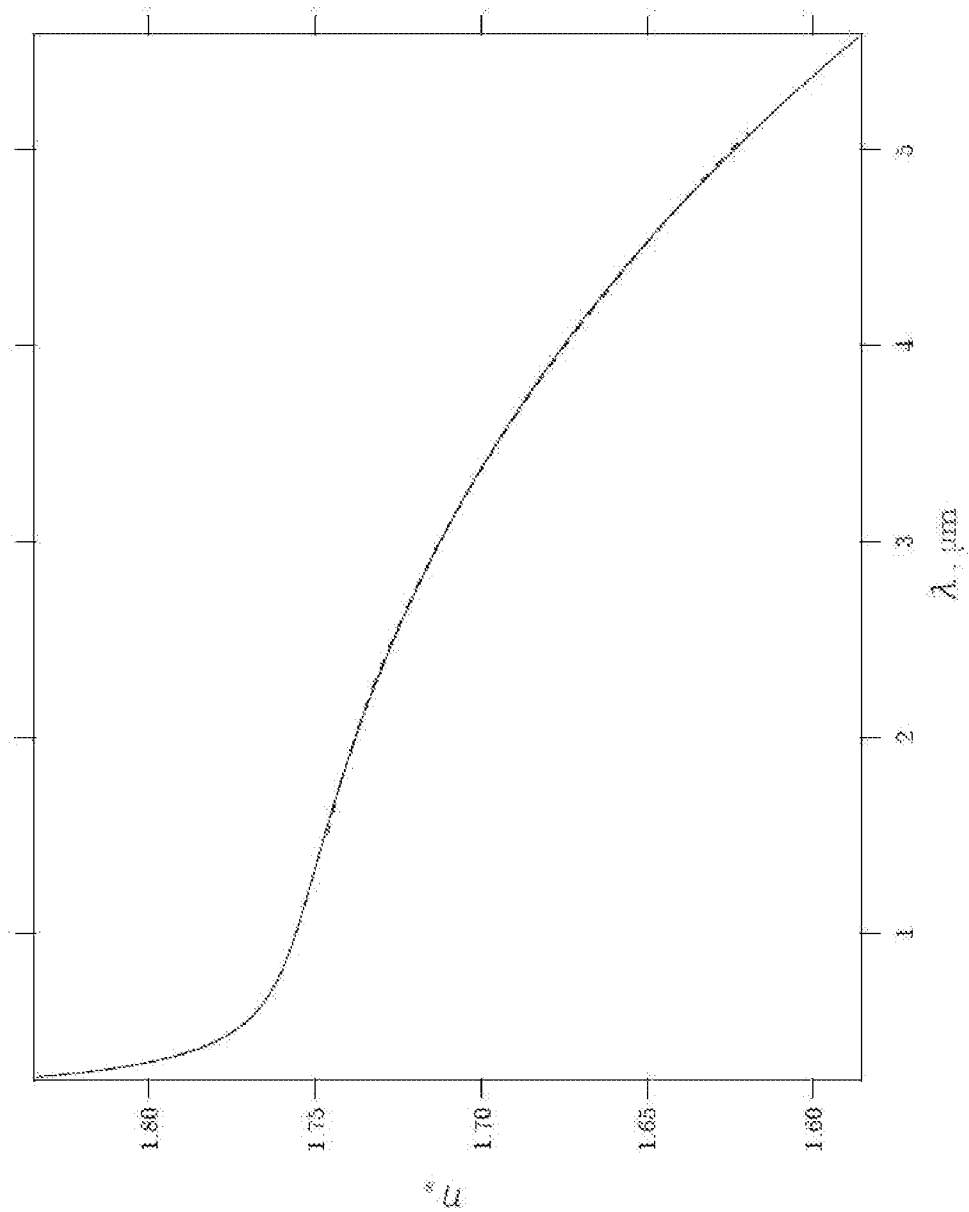
FIG. 10: Refractive index of sapphire (at 20 °C); the dashed curve is a quadratic between approximately 1.5 μm and 5 μm.

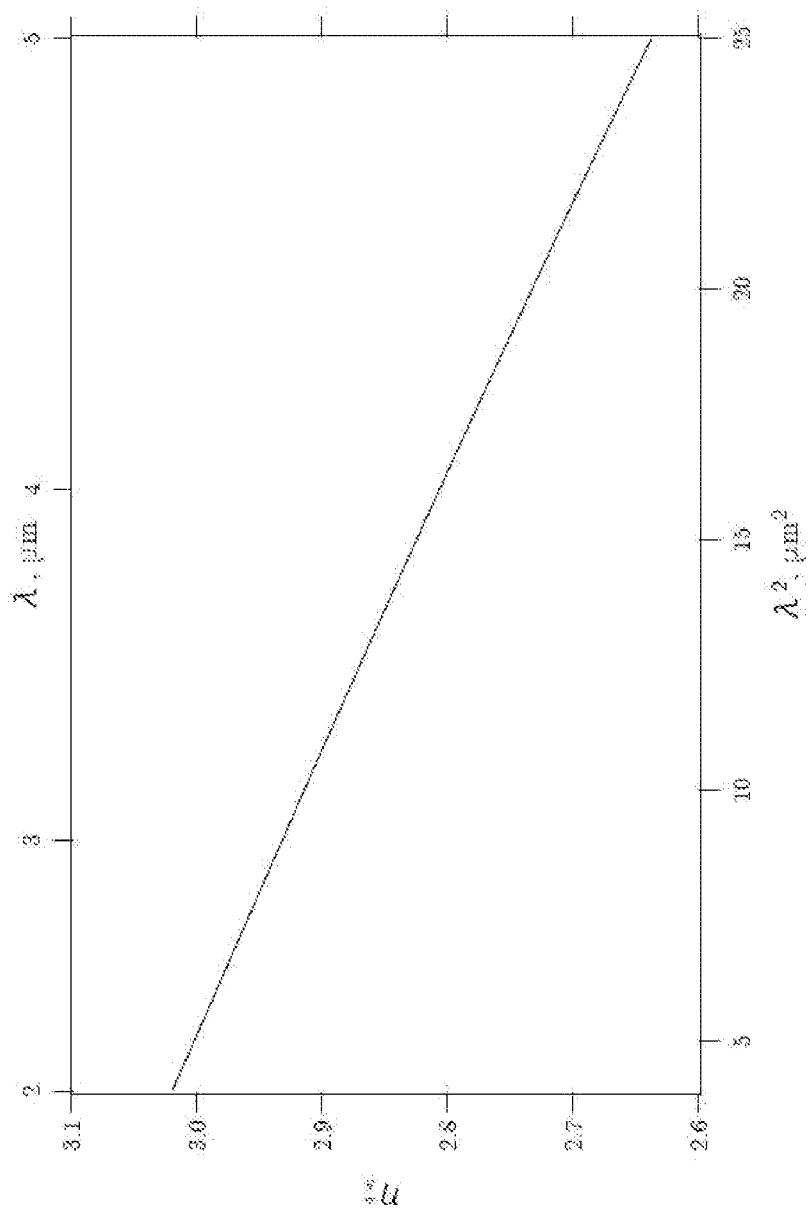
FIG. 11: Function of refractive index of sapphire (at 20°C) versus square of wavelength.

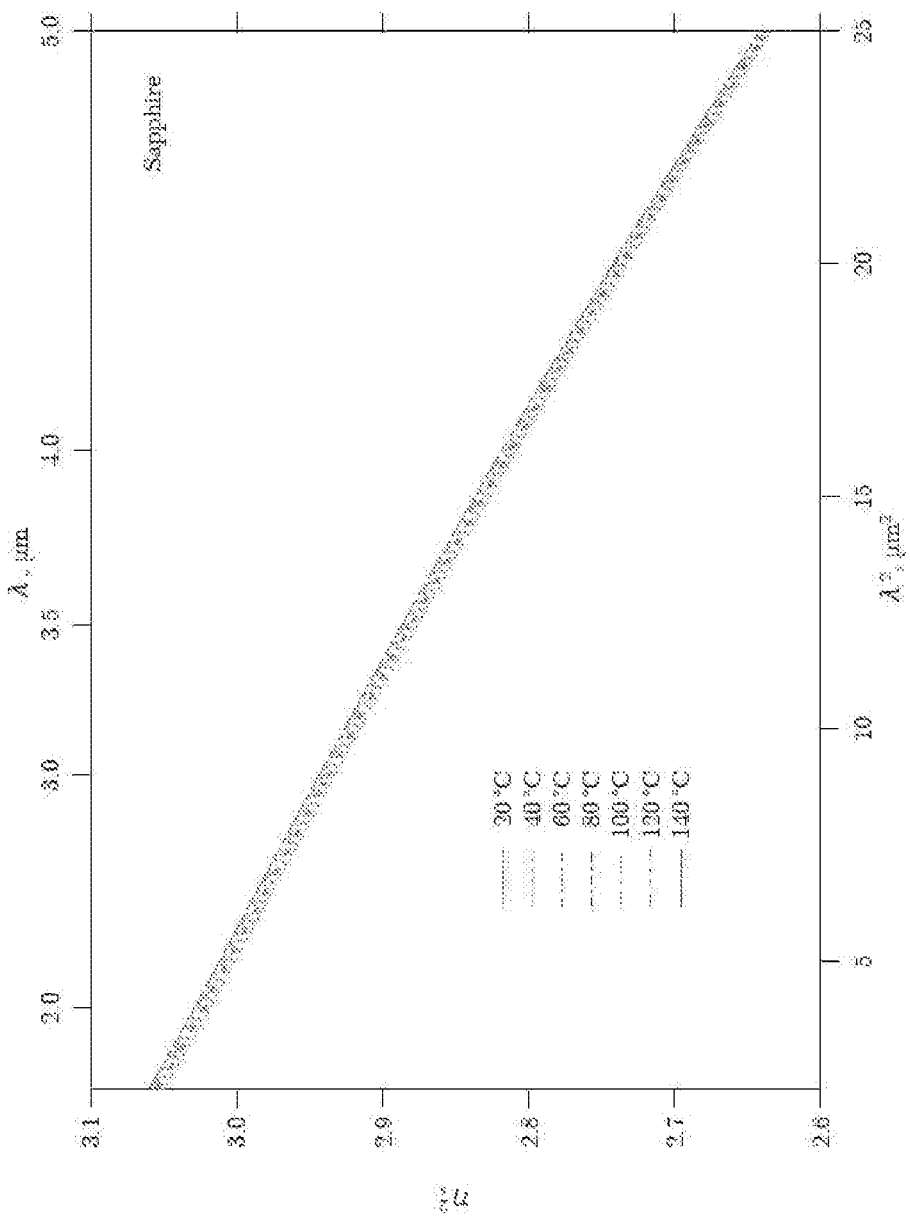
FIG. 12: Refractive index of sapphire shows negligible variation with respect to temperature in comparison to wavelength over the ranges of interest.

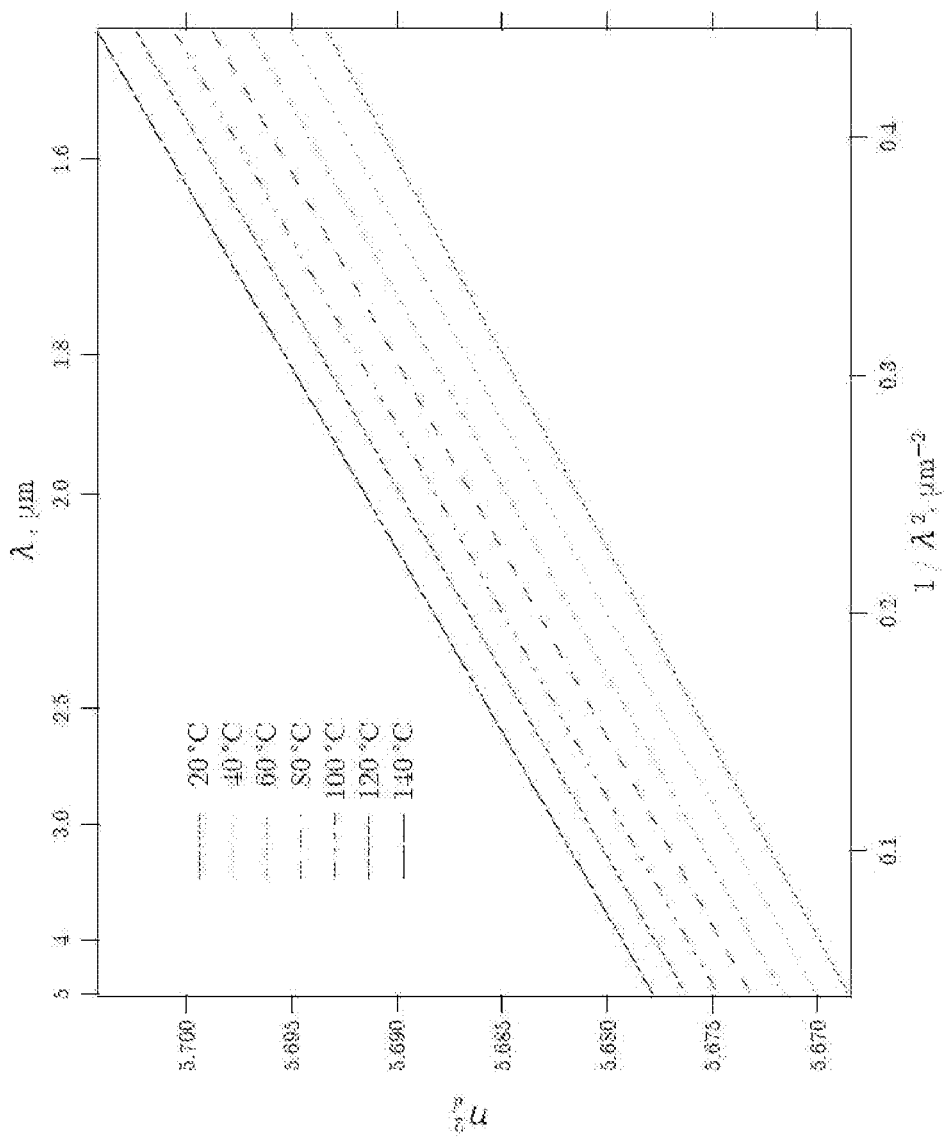
FIG. 13: Refractive index of diamond near linear dependence with respect to reciprocal of square of wavelength and negligible temperature dependence; the vertical scale is exaggerated.

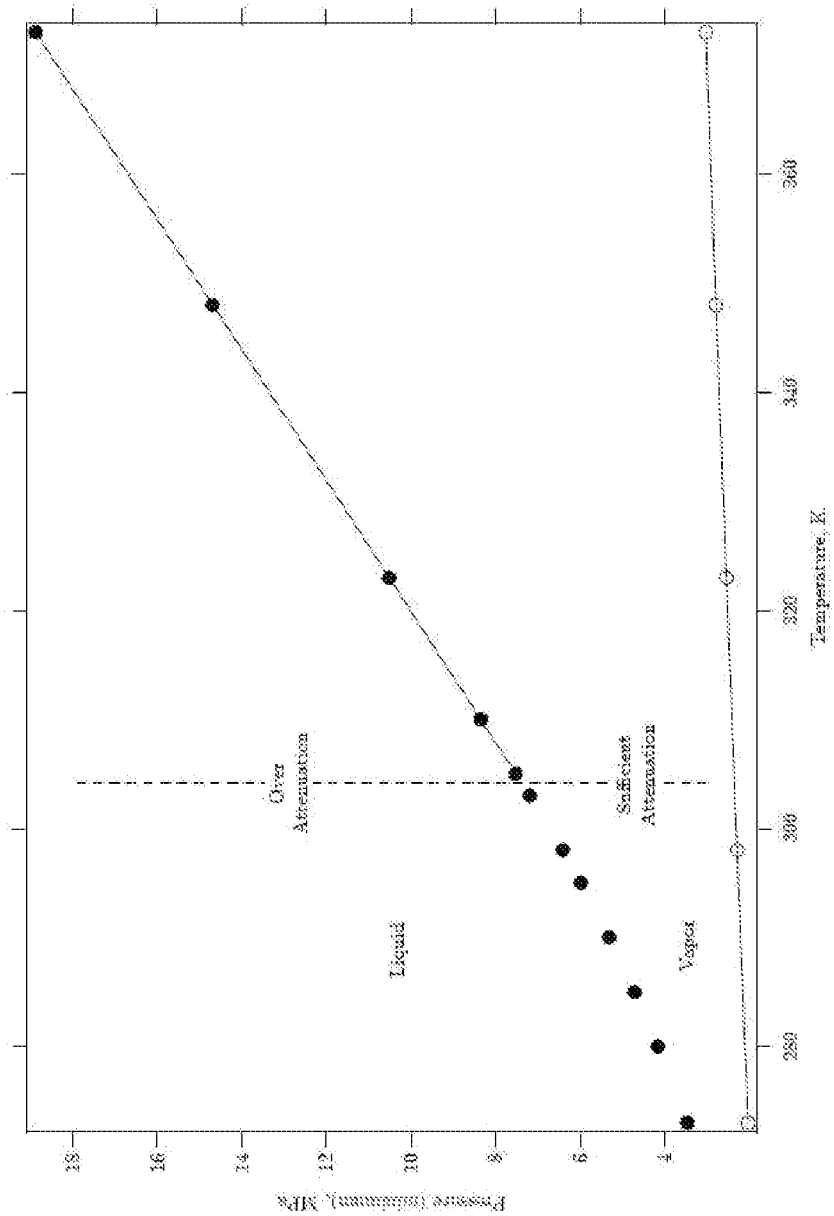
FIG. 14: Minimum and maximum $CO_2$ pressures required for attenuation to be in range for $\epsilon_c$ calibration

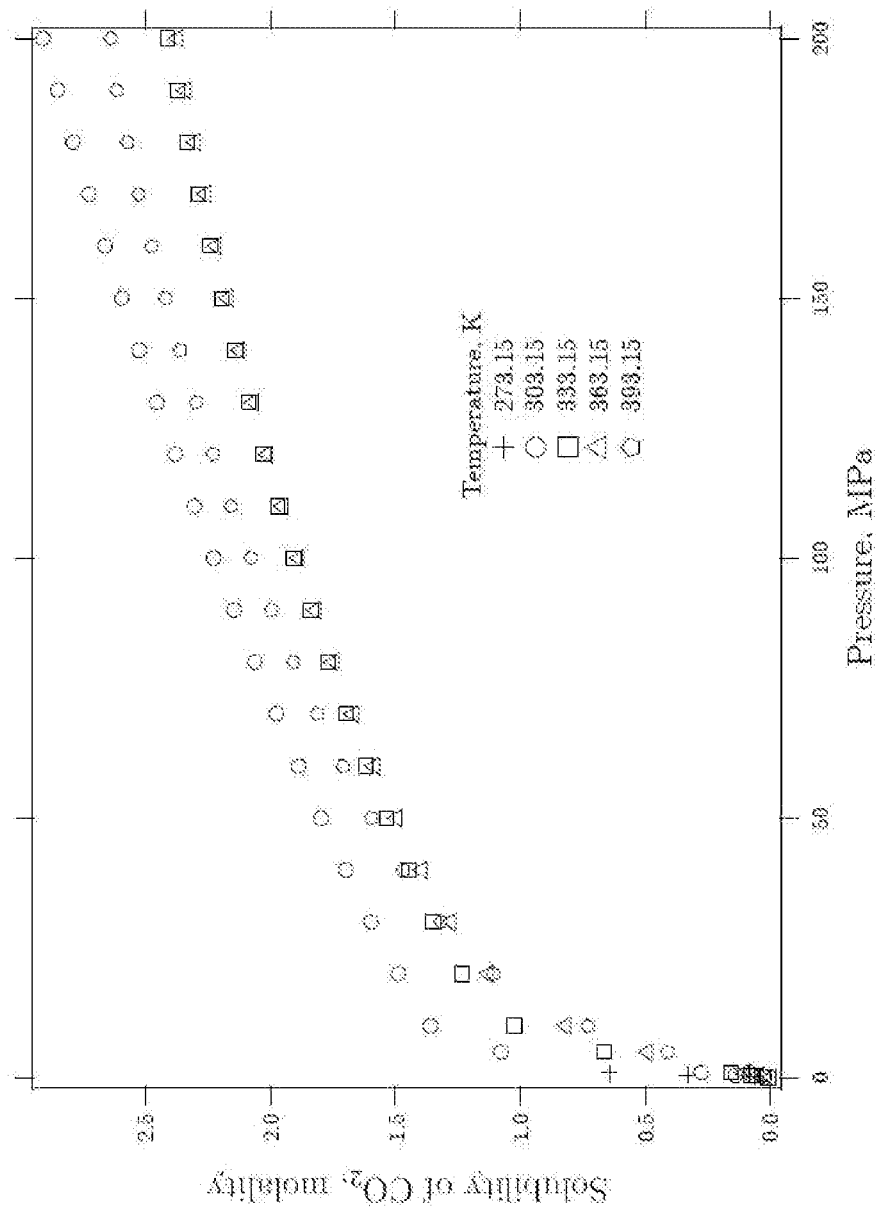
FIG. 15: Solubility of $CO_2$ in water as computed using Duan and Sun [2003] model are shown for different temperatures.

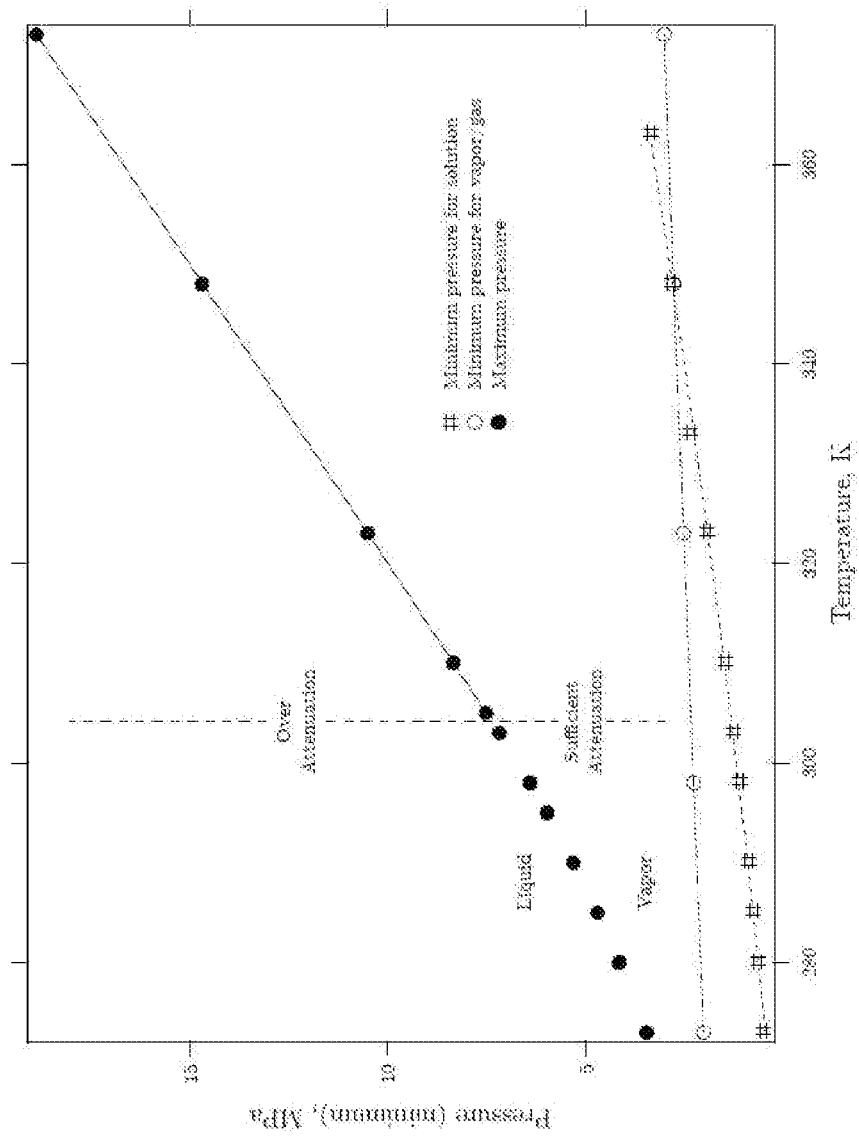

FIG. 16: Minimum $CO_2$ pressures required for attenuation to be in range for $c_o$ calibration can be reduced by calibrating with aqueous solution of $CO_2$. Note that above a temperature of about 347 K, the minimum pressure required with pure $CO_2$ is lower than with solution. This is primarily due to fluid refractive index effect and ignores the variation of refractive index of $CO_2$, since one bracketing of minimum and maximum pressures is meant to be a guide. The curves through computed points is a least square fit.

ATTENUATED TOTAL REFLECTION BASED MEASUREMENT OF REFRACTIVE INDEX AND CARBON DIOXIDE CONCENTRATION

CROSS REFERENCE TO RELATED APPLICATIONS

The present application claims priority benefit of U.S. Provisional Application No. 63/269,882 filed Mar. 24, 2022, the entirety of which is incorporated by reference herein and should be considered part of this specification.

BACKGROUND

The present disclosure generally relates to a tool for determining a refractive index and concentration of carbon dioxide of a formation fluid using attenuated total reflection.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Measurement of composition based on attenuated total reflection requires refractive index of the fluid. Since the index itself is a function of the composition, independent refractive index data is necessary to infer composition, particularly that of dissolved carbon dioxide. Conversely, the index can be correlated to a range of physical properties of interest (e.g., density, composition and polarizability), and a self-consistency check between composition and refractive index may be carried out. Consistency improves measurement confidence.

Previous methods for inferring refractive index include measuring attenuated total reflection using either two different crystal materials cut with the same truncated-cone geometry, or the same material with differing cone angle of the frustrum, or both. Such methods assume a fixed crystal material refractive index over the wavelengths of measurement, and that the refractive index of the fluid is non-dispersive or invariant to the wavelength of the probing electromagnetic beam. Therefore, any wavelength dependent variation in refractive index in the crystal or the fluid introduces an error in the estimated composition of the fluid. It is desirable to remove this error by, for example, inferring the variation of the refractive index of the fluid with respect to the wavelength, and accounting for such variation in estimating fluid composition.

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include a tool for determining a refractive index of a formation fluid. The tool includes a body having a fluid admitting assembly and a flow line that receives the formation fluid. The tool also includes two different crystals having faces in contact with fluid in the flow line. The crystals have at least one of different refractive indices and different angles of incidence. The tool further includes at least one light source coupled to the crystals and configured to direct light into the crystals. The light has at least one wavelength. In addition, the wavelength, the refractive indices, and the angles of incidence are configured such that the light undergoes total internal reflection at interfaces between the crystals and the formation fluid. The tool also includes at least one light detector coupled to the crystals and configured to measure reflected light exiting the crystals. The tool further includes at least one processor coupled to the at least one light detector. The at least one processor is configured to continuously and iteratively, in substantially real-time, determine attenuations of the light entering the crystals, and determine the refractive index of the formation fluid and a carbon dioxide concentration in the formation fluid utilizing the attenuations to account for variations in the refractive index of the formation fluid.

Certain embodiments of the present disclosure also include a method for determining a refractive index of a formation fluid. The method includes placing into a borehole a tool having a fluid admitting assembly, a flow line, two different crystals in contact with the formation fluid in the flow line, at least one light source, at least one light detector and associated signal processing circuitry, and at least one processor. The crystals have at least one of different refractive indices and different angles of incidence. The method also includes moving the fluid admitting assembly of the tool into contact with a formation at a location of interest in the formation. The method further includes causing formation fluid to flow into the flow line of the tool and into contact with the crystals. In addition, the method includes directing light from the at least one light source into the crystals. The method also includes detecting with the at least one light detector the light exiting the crystals. The crystals and the at least one light source are configured such that the light will undergo total internal reflection at interfaces between the crystals and the formation fluid. The method further includes using the associated signal processing circuitry to compare the exiting light to a reference light value for the at least one light source associated with the at least one detector in order to obtain attenuation values. In addition, the method includes using the at least one processor to continuously and iteratively, in substantially real-time, determine attenuations of the light entering the crystals, determine the refractive index of the formation fluid, and determine a carbon dioxide concentration in the formation fluid utilizing the attenuations to account for variations in the refractive index of the formation fluid at measurement wavelengths and reference wavelengths.

Certain embodiments of the present disclosure also include tool for determining a refractive index of a formation fluid. The tool includes two different crystals having faces in contact with fluid in a flow line. The crystals have at least one of different refractive indices and different angles of incidence. The tool also includes at least one light source coupled to the crystals and configured to direct light into the crystals. The tool further includes at least one light detector coupled to the crystals and configured to measure reflected light exiting the crystals. In addition, the tool includes at least one processor coupled to the at least one light detector, wherein the at least one processor is configured to continuously and iteratively, in substantially real-time, determine attenuations of the light entering the crystals, and determine the refractive index of the formation fluid and a carbon dioxide concentration in the formation fluid utilizing the attenuations to account for variations in the refractive index of the formation fluid.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which:

FIGS. 3a and 3b are schematic diagrams showing crystals arranged relative to a flow line, in accordance with embodiments of the present disclosure;

FIGS. 4-8 are plots of a double normalized function for the effective path length for diamond and sapphire, in accordance with embodiments of the present disclosure;

FIG. 9 is a plot of a crystal correction coefficient with respect to sapphire, in accordance with embodiments of the present disclosure;

FIG. 10 is a plot of the refractive index of sapphire, in accordance with embodiments of the present disclosure;

FIGS. 11 and 12 are plots of a function of the refractive index of sapphire versus square of wavelength, in accordance with embodiments of the present disclosure;

FIG. 13 is a plot of the refractive index of diamond near linear dependence with respect to reciprocal of square of wavelength and negligible temperature dependence, in accordance with embodiments of the present disclosure;

FIG. 14 is a plot of the minimum and maximum carbon dioxide pressures required for attenuation to be in range for $\in_c$ calibration, in accordance with embodiments of the present disclosure;

FIG. 15 is a plot of the solubility of carbon dioxide in water, in accordance with embodiments of the present disclosure;

FIG. 16 is another plot of the minimum and maximum carbon dioxide pressures required for attenuation to be in range for $\in_c$ calibration, in accordance with embodiments of the present disclosure.

DETAILED DESCRIPTION

Figure 1:
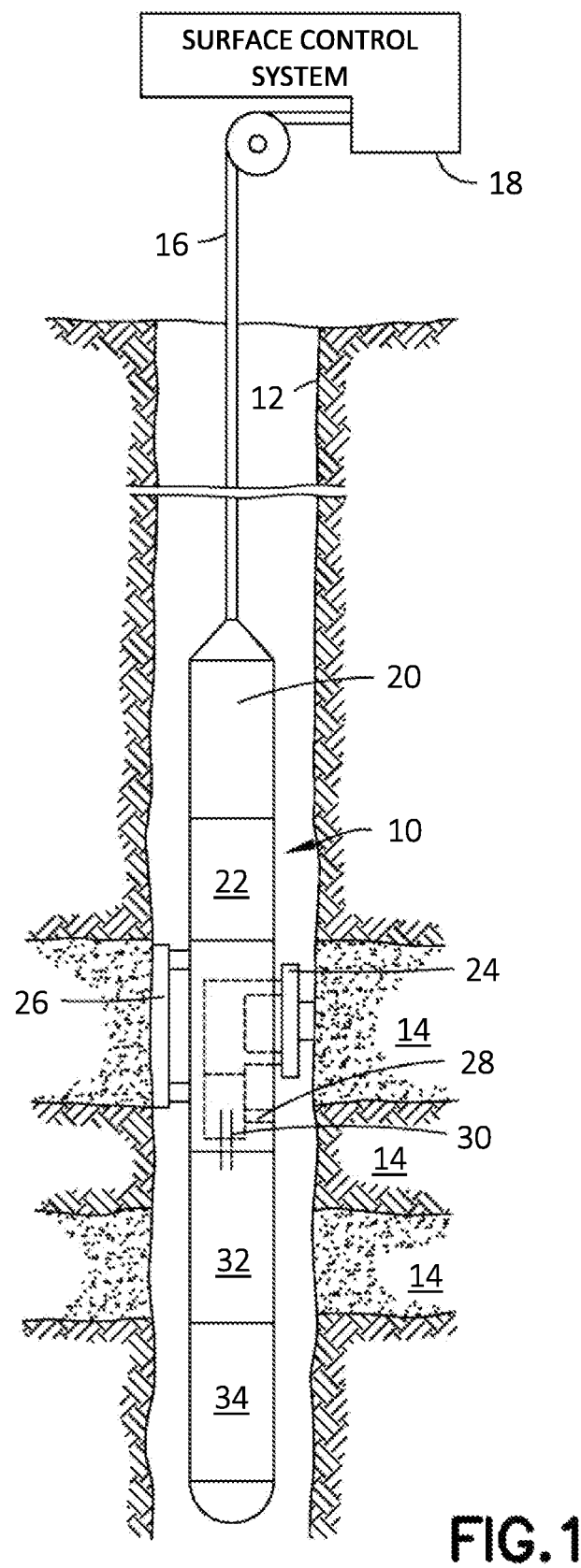
FIG. 1 is a schematic diagram of a downhole apparatus for determining the refractive index of a formation fluid, in accordance with embodiments of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequently, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention).

As described above, previous methods for inferring refractive index assumed a fixed crystal material refractive index over the wavelengths of measurement, and that the refractive index of the fluid was non-dispersive or invariant to the wavelength of the probing electromagnetic beam. As such, any wavelength dependent variation in refractive index in the crystal or the fluid introduces an error in the estimated composition of the fluid.

The embodiments described herein include variation of refractive index of the crystal with respect to wavelength. Within the band of measurement, the embodiments described herein allow the refractive index of the fluid be different at each of the probing wavelengths. Total internal reflection is assumed to occur. Therefore, the embodiments described herein have the potential to improve accuracy of not only the refractive index measurement, but also of the inference of dissolved gas (usually carbon dioxide ($CO_2$)) fraction. Hydrocarbon solvents for illustrative purposes are broken into light and heavy, although a greater number of components may be chosen, depending on the availability of more reference wavelengths. The refractive index dispersion characteristics may be inferred, depending on the number of frequencies or wavelengths deployed.

To provide context, during both injection and production of oil and gas operations, reservoir fluids are monitored. In enhanced oil recovery (EOR) processes, compositional measurements of fluid phases are useful for quantitative evaluation of displacement induced migration. Specifically, data relating to fluid characterization in different producing zones may be used to infer reservoir structure, optimize zonal production strategies, quantify hydrocarbon quality, and facilitate recycling of injected gases, such as $CO_2$.

To measure concentrations, one approach is to withdraw fluid samples from the reservoir using a formation testing probe or packed-off intervals. In certain embodiments, sensors may be used within the flow line to measure transmission at infra-red (IR) wavelengths. The spectral characteristics of the transmitted beam are indicative of various components within the fluid, each chemical component having its own absorption coefficient. In addition, density and viscosity may also be used to ensure consistent component fractions.

As described in greater detail herein, attenuated total reflection (ATR) measurement at mid-IR frequencies may be used to measure dissolved components (e.g., $CO_2$ within a liquid). These methods rely on the attenuation of a reflected wave due to a small penetration (e.g., usually a fraction of a wavelength) of the incident beam's evanescent wave, the penetration depth being dependent on the refractive indices of the fluid and the crystalline material, such as sapphire or diamond or zirconia, in contact with it. The incident angle of the beam at the crystal-fluid interface, and therefore the geometry, also affects the effective penetration depth. The crystal is transparent to incident and reflected infra-red electromagnetic wave and has a refractive index sufficiently larger than the fluid to enable total reflection.

In the absence of any information, a nominal refractive index for the fluid may be assumed. Such assumption is acceptable when the solute concentrations are relatively low and the refractive index is determined by the solvent. However, for relatively high solute concentrations, such assumption may lead to inaccuracies if the fluid's index varies with the concentration of the dissolved components. In certain embodiments, such limitations may be overcome by collecting two attenuation measurements with differing crystal geometries, or differing materials, or both, and inferring $\eta_f$, the fluid refractive index. In such embodiments, it may be assumed that $\eta_f$ as well as $\eta_\kappa$, the crystal's refractive index, are constant over the span of the measurement wavelength.

However, real fluids and materials used for ATR measurements may show a level of dispersion that should not be entirely ignored if accurate determinations of $\eta_f$ are necessary to estimate effective penetration length and fluid composition. Besides geometry, the penetration distance of the evanescent wave is dependent on $\eta_f$ and $\eta_\kappa$, and, therefore, their variability with respect to wavelength.

The embodiments described herein continuously measure the refractive index of the fluid in order to correct for the change in the penetration depth in substantially real-time, while accounting for variations of $\eta_\kappa$ and $\eta_f$ with respect to wavelength A. Since a direct measurement for refractive index is utilized in conjunction with the ATR, temperature adjustment for penetration distance is avoided. In addition, the embodiments described herein also avoid infrared background correction. The embodiments described herein may be implemented as a plug-in to current formation testers.

FIG. 1 illustrates a downhole apparatus 10 for determining the refractive index of a formation fluid. As illustrated, in certain embodiments, the downhole apparatus or tool 10 may be suspended in a borehole 12 traversing a formation 14 by a cable 16 that is spooled in a usual fashion on a suitable winch (not shown) on the formation surface. On the surface, the cable 16 may be electrically coupled to a surface control system 18. The downhole tool 10 includes an elongated body 20 that encloses a tool control system 22. In certain embodiments, the elongated body 20 also includes a selectively extendable fluid admitting assembly 24 and a selectively extendable tool anchoring member 26, which are respectively arranged on opposite sides of the body 20. In certain embodiments, the fluid admitting assembly 24 is configured to selectively seal off or isolate selected portions of the wall of the borehole 12 such that pressure or fluid communication with the adjacent formation 14 is established. In addition, in certain embodiments, the downhole tool 10 includes a fluid analysis module 28 with a flow line 30 through which fluid collected from the formation 14 flows. The fluid may thereafter be expelled through a port (not shown) or may be directed to one or more fluid collecting chambers 32, 34, which may receive and retain the fluids collected from the formation 14. As described in greater detail herein, the fluid admitting assembly 24, the fluid analysis module 28, and the flow path to the fluid collecting chambers 32, 34 may be controlled by the control systems 18, 22.

Figure 2:
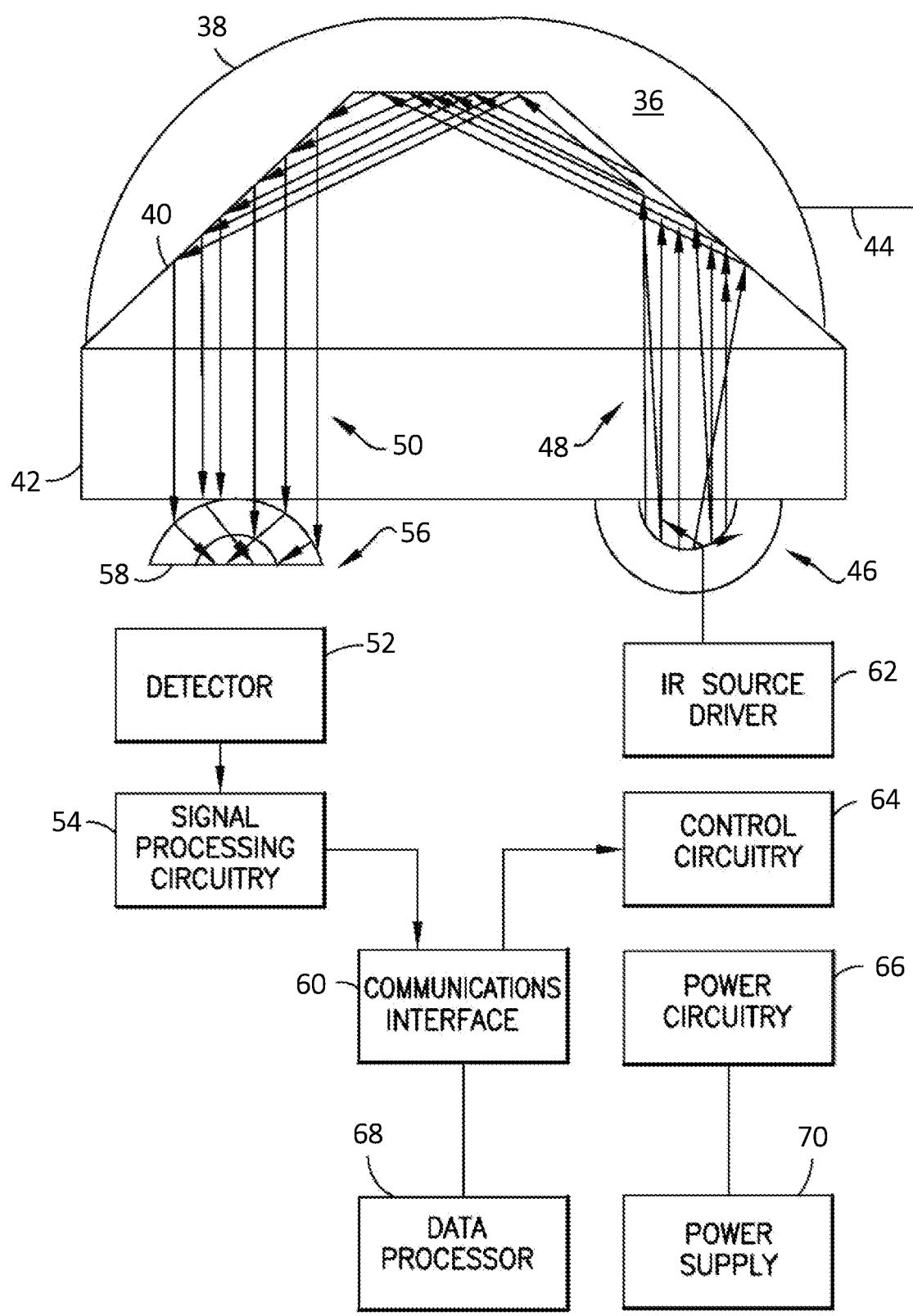
FIG. 2 is a partial block, partial schematic diagram of elements of the downhole apparatus of FIG. 1, in accordance with embodiments of the present disclosure.

In certain embodiments, at least two sample chambers 36 may be placed in communication with the flow line 30 as described with respect to FIGS. 3a and 3b. Each sample chamber 36 may be configured as illustrated in FIG. 2. In particular, each sample chamber 36 may be bounded by a cover 38 and an exterior surface 40 of an optically dense crystal 42. The flow line 30 provides for supply of a fluid sample 44 into the sample chamber 36 such that liquid fluid (i.e., of the fluid sample 44) is in direct contact with the exterior surface 40 of the crystal 42. An infrared (IR) light source 46 generates a beam of IR radiation 48 that is directed into the crystal 42 such that it is incident on the interface of the crystal 42 and the liquid fluid of the fluid sample 44 at an angle larger than the critical angle $\theta_c$, which is a function of the refractive indices of both the fluid sample 44 and the crystal 42 and is given by $$\theta_c = \sin^{-1}\frac{\eta_f}{\eta_\kappa},$$

where $\eta_\kappa$ is the refractive index of the crystal 42 and $\theta_f$ is the refractive index of the fluid sample 44. The internal reflection of the beam 48 can occur multiple times along the interface of the crystal 42 and the fluid sample 44. The crystal 42 may be a high refractive index material, such as sapphire or diamond, in order to minimize the critical angle $\theta_c$.

In the regions of the IR spectrum where the fluid sample 44 absorbs energy, the evanescent wave at those wavelengths will be attenuated. The crystal 42 directs the reflected beam 50 (e.g., including the attenuated energy from each evanescent wave) for supply to an IR detector 52. As described in greater detail herein, in certain embodiments, signal processing circuitry 54 (e.g., amplifier and filter circuitry, A/D conversion circuitry, and so forth) processes the output of the IR detector 52 to measure and process the output of the IR detector 52, thereby measuring the intensity of the detected light within the predetermined IR measurement bands as a function of time, and generating digital data corresponding to such measurements. In certain embodiments, one or more predetermined IR measurement bands include a predetermined absorption band centered around 4.27 micrometers (μm) (e.g., 4.27 μm±75 nanometers (nm)), a predetermined reference band centered around 2.5 μm (e.g., 2.5 μm±75 nm), and a reference band centered around 3.5 μm (e.g., 3.5 μm±75 nm). The reference wavelengths are chosen to distinguish solvent components such that no absorption of the desired dissolved component occurs at the reference wavelength.

In certain embodiments, the reflected beam 50 (e.g., including the attenuated evanescent waves) may be guided by a lens 56 through an optical filter 58 to the IR detector 52. The optical filter 58 may provide bandpass optical filtering for the predetermined infrared measurement (and reference) bands. In certain embodiments, the IR detector 52 may include an array of IR detector elements corresponding to the predetermined infrared measurement bands. Alternatively, in other embodiments, a single IR detector element may be used.

In certain embodiments, additional supporting electronics may be used in conjunction with the IR light sources 46 and IR detectors 52. In certain embodiments, the supporting electronics may be provided for each IR light source 46 and each IR detector 52 or may be shared by the IR light sources 46 and by the IR detectors 52. As illustrated in FIG. 2, in certain embodiments, such supporting electronics may include a data communication interface 60, IR source driver circuitry 62, control circuitry 64, and power circuitry 66. In certain embodiments, the data communications interface 60 may be electrically coupled to the signal processing circuitry 54 and may operate to communicate digital data generated by the signal processing circuitry 54 (e.g., which represents the intensity of the detected light within the predetermined IR measurement band(s) as a function of time) to an external data processor 68.

In certain embodiments, the data processor 68 may process the digital data as described in greater detail herein in order to determine the refractive index of the fluid sample 44. In certain embodiments, the IR source driver circuitry 62 may generate electrical signals for the IR light source 46 in order to operate the IR light source 46 as desired. In addition, in certain embodiments, the data processor 68 may send control signals (e.g., via the communications interface 60) to the control systems 18, 22 illustrated in FIG. 1 to cause the control systems 18, 22 to control certain surface and/or downhole equipment based at least in part on data processing performed by the data processor 68, which will be described in greater detail herein.

In certain embodiments, the control circuitry 64 may control operation of the electrical, optoelectrical and/or optical elements of the downhole tool 10 illustrated in FIG. 1 in accordance with commands communicated from the external data processor 68 to the control circuitry 64 via the communications interface 60. For example, in certain embodiments, the control circuitry 64 may interface to the IR source driver circuitry 62 to activate and control the operational mode of the IR light source 46 via commands issued by the external data processor 68 and communicated thereto via the communications interface 60. In addition, the control circuitry 64 may carry out other control operations as desired. In certain embodiments, the power circuitry 66 may receive power supply signals from an external power supply 70 and transform and/or condition these signals into a form suitable for supply to the electrical and optoelectrical elements of the downhole tool 10. In certain embodiments, the operation of the power circuitry 66 may include AC-DC conversion functions, DC-DC conversion functions, voltage regulation functions, current limiting functions, and other power conditioning functions.

Turning now to FIG. 3a, in certain embodiments, two different crystals 42, 42b may be disposed adjacent each other and along a flow line 30. In certain embodiments, the different crystals 42a, 42b may have different geometries. By way of example only, a first crystal 42a is a sapphire ATR crystal having faces (e.g., exterior surfaces) that angle at 75° from the horizontal, whereas a second crystal 42b is a sapphire ATR crystal having faces that angle at 65° from the horizontal. When the crystals 42a, 42b are in contact with formation fluids (e.g., the fluid sample 44 described with respect to FIG. 2), both crystals 42a, 42b are expected to have total internal reflection. In the configuration illustrated in FIG. 3a, the crystals 42a, 42b are arranged such that fluid flowing through the flow line 30 (e.g., the direction indicated by the arrow) will be first in contact with the first crystal 42a and then in contact with the second crystal 42b. Assuming that the fluid is generally homogeneous, measurements may be collected simultaneously. On the other hand, if it is assumed that the fluid is not homogeneous, the measurements may be made sequentially when it is expected that the same fluid is adjacent to the respective crystals 42a, 42b.

FIG. 3b illustrates another embodiment having two different crystals 42c, 42d. The crystals 42c, 42d are illustrated as facing each other on opposite sides of the flow line 30. In certain embodiments, the crystals 42c, 42d may have different geometries. By way of example only, a first crystal 42c is a sapphire ATR crystal having faces (e.g., exterior surfaces) that angle at 75° from the horizontal, whereas a second crystal 42d is a sapphire ATR crystal having faces that angle at 65° from the horizontal. Because the crystals 42c, 42d are disposed opposite each other with the fluid from the flow line 30 passing therebetween, measurements involving the crystals 42c, 42d may be made simultaneously. It is also to be understood that the two crystals 42c, 42d may be placed such that the flat faces of the crystals 42c, 42d facing the fluid of the two crystals 42c, 42d may be placed at the same axial location but at right angles to each other, or any other suitable angle.

In other embodiments, the different crystals (e.g., either the crystals 42a, 42b illustrated in FIG. 3a or the crystals 42c, 42d illustrated in FIG. 3b) may have substantially identical geometries (e.g., angles of incidence), but may be made from different materials (i.e., the crystals may have different refractive indices). By way of example only, one crystal may be a sapphire crystal and the other crystal may be a diamond crystal. In yet other embodiments, both the materials and the angles of incidence (e.g., geometries) of the different crystals may be different. In certain embodiments, the geometry of each material may be optimized in order to maximize sensitivity to $\eta_f$. Within an expected range of $\eta_f$, the configuration may be tailored so that the difference in the attenuation between the two crystals is maximized for the same wavelength $\lambda$ and number of reflections $N_R$.

Conventional refractometers have been used to estimate the refractive index of crude oil in a surface laboratory at a specified wavelength. Unfortunately, sampled reservoir fluids may be contaminated by drilling-mud filtrate. The accuracy of the estimated refractive indices is dependent on both sample withdrawal techniques and the extent to which reservoir conditions are replicated in surface laboratories. It is known that contaminants introduced or removed during the fluid transfer process from downhole to laboratory may introduce a significant bias in the estimates of refractive index. It is logistically difficult and expensive to routinely bring reconstituted representative samples to the laboratory for analysis.

Another challenge arises due to the variability of refractive index with temperature, fluid composition, and pressure. For example, significant variation in the refractive index of glycerin and paraffin oil has been observed at relatively high pressures. In addition, refractive index of other fluids varies with dissolved species, and this dependence is roughly given by the Lorentz-Lorenz relationship. Also, variation of refractive index with dissolved $CO_2$ in hydrocarbon systems is inevitable, and has indeed been the basis of mapping $CO_2$ concentrations within a liquid.

For completeness, a brief review of commonly used refractometers for crude oil in surface labs is provided here:

The Abbe refractometer is based on total internal reflection of the incident beam at the interface of the sample and the measuring prism. The sample and prism are placed in direct contact. The measurement relies on inferring the critical angle of total reflection ($\theta_c$). This is the incident angle for which the refracted ray travels along the boundary between the two media. In this refractometer, a source irradiates light from a wide range of incident angles onto a prism. For an incident angle, $\theta_i < \theta_c$ the light is partly refracted and reflected. On the other hand, for $\theta_i > \theta_c$, the light is totally reflected. A sensor array measures the reflected light intensity, and monitors the transition of partly reflected to totally reflected light for estimating the critical $\theta c$. The refractive index of fluid is then obtained from Snell's law.

The Interferometric refractometer is based on the principle of interference. It uses interferometry to measure the difference in light velocity in different media. This measurement principle is best suited for solids or thin films. In recent years, this technology has been modified for liquid samples.

Other bench-top devices such as the Pulfrich refractometer and Immersion refractometer are well-known devices for measuring refractive index. Both are critical angle refractometers with variations in implementation of the principle of total internal reflection. Like the Abbe refractometer, these technologies are robust and precise for conducting measurements in laboratory environments. For example, a Peltier device is routinely used to avoid temperature variations between the sample and the sensing prism. These refractometers are not well suited for conducting downhole measurements and fluid analysis.

The refractive index, n, is the reciprocal of the ratio of the phase velocity ($v$) in the medium to the speed of light in vacuum (c):

$$\eta = \frac{c}{v}, \tag{1}$$

Light travels slower in other media relative to vacuum because of electromagnetic field interactions with the charged particles of the medium. Refractive index and the speed of light in a medium are dependent both on temperature and pressure. Various relationships have been proposed to capture the dependence between refractive index and mass density. For example, in miscible systems, the Gladstone-Dale equation is:

$$\frac{\eta - 1}{\rho} = \sum_{i=1}^{N} w_i \eta_{Mi}, \tag{2}$$

where $\rho$ is the mass density of the medium and $\eta M_i$ is the molar refractivity of the $i^{th}$ component. Mass fraction of the component i is $w_i$. Another well-known relationship is the Lorentz-Lorenz equation:

$$\frac{\eta^2 - 1}{\eta^2 + 2} = \left(\frac{N_A \alpha}{3M}\right)\rho, \tag{3}$$

where $\alpha$ denotes the molecular polarizability of the medium, $N_A$ is the Avogadro's number, and M is the molecular weight of the medium. The polarizability is the coefficient of proportionality between the dipole moment and the electric field.

Measurements of refractive index may be combined with one or more of the aforementioned formulae and others to obtain consistent physical properties of interest, including mass density, composition of crude oil, viscosity etc. within a restricted series of materials. These estimates are useful for reservoir modeling.

In many other ways, the measurement of refractive index is quite important. For example, in certain embodiments, dissolved $CO_2$ concentration may be measured using the attenuation of a reflected signal at mid-IR wavelengths. This method, however, requires refractive index of the liquid within which the $CO_2$ concentration needs to be obtained. Unlike aqueous solutions, in many instances (e.g., hydrocarbon solvent), the dissolved amount of $CO_2$ is sufficiently large that it changes the refractive index of the phase under examination. Then, the dissolved fraction may not be obtained directly. It is for this reason that the two-crystal configuration described with respect to FIGS. 3a and 3b may be used to infer $\theta_f$ for subsequent determination of dissolved $CO_2$.

The embodiments described herein present a new measurement principle that uses a combination of two or more attenuated total reflectance (ATR) sensors to measure the refractive index of fluid ($\eta_f$) downhole at the measurement wavelengths including that of the reference. We also take into account the variation of $\eta_\kappa$ (e.g., refractive index of crystal, $\kappa$, is a generic indicator for crystal and may refer to sapphire, diamond, zirconia, and so forth) with respect to wavelength, since multiple wavelengths are used in such a measurement. A reference wavelength, $\lambda_r$, at which there is no attenuation by the dissolved component (e.g., here $CO_2$) whose fraction is desired is necessary, and is different from the dissolved component absorption wavelength $\lambda_m$. Depending on the nature of the solvent, we may need more than one reference wavelength. In $CO_2$ enhanced oil recovery, at a minimum, crude oil is divided into light and heavy components. The embodiments described herein illustrate the principle by having two reference wavelengths $\lambda_r$ and $\lambda_R$, although the number of reference wavelengths may be more and is at least equal to the number of components assumed to constitute the solvent. The values of $\eta_\kappa$ and $\eta_f$ at wavelengths $\lambda_r$, $\lambda_R$, and $\lambda_m$ are not the same, and variation with respect to $\lambda$ is consequential for determining penetration lengths over which absorption and scattering cause attenuation. Since the penetration length depends on the refractive index ratios at each of the wavelengths, attenuation is a function of not only the (natural log) molar attenuation coefficient $\in_i$ of species i and its molar concentration $C_i$, but also the refractive index ratios (which in turn may vary with $C_i$). Thus, in order to infer the concentration of species causing intensity reduction from the optical measurement, refractive index of the fluid at the said measurement wavelength may first be determined, with the molar attenuation coefficient known. Determination of these quantities for subsequent use for inferring dissolved component concentration is one of the purposes of the embodiments described herein. Certain embodiments of the present disclosure focus on the mid-infrared (m-IR) range; however, the techniques described herein are also extensible to a different range of wavelengths as long as the fundamental equations describing attenuation is rooted in Beer-Lambert's law described below.

At this point, it may be useful to state notations for clarity. Molar concentration is C, and its subscript may be l, h, or c, referring to light and heavy components of solvent, and $CO_2$. Similarly, as stated before, are the (natural log) attenuation coefficients given by $\in_i$, i=l, h, or c. In our problem, concentrations are spatially uniform through the liquid over the path length, l. In a transmission experiment, l is readily identified. In attenuated total reflection, path length is obtained by solving the relevant electromagnetic equations of Maxwell, and an effective path length equivalent to a transmission experiment is identified. It is sufficient to know that the effective path length varies with the refractive indices of the fluid and the crystal, and that these may vary with wavelength, temperature, and pressure. The path length also changes with incident angle.

Beer-Lambert law with absorbance $A_e$ written in terms of natural logs of ratio of intensity measured I to source intensity $I_0$ is:

$$A_e = -\ln\frac{I}{I_0} = \sum_{i=l,h,c} \epsilon_i C_i \ell, \quad (4)$$

For completeness, the traditional chemistry definition of absorbance in terms of logs will be discussed. Here, absorbance A is given as:

$$A = -\log\frac{I}{I_0} = \sum_{i=l,h,c} \varepsilon_i C_i \ell, \quad (5)$$

or $\varepsilon_i = (1/\ln 10)\epsilon_i$. The embodiments described herein may utilize either of these. Unless otherwise stated, $\epsilon_i$ will be used herein to refer to molar attenuation coefficients.

As used herein, non-hatted notation implies a value, and accented parameters imply functions. Since a main concern described herein is wavelength and concentration dependence of refractive indices, temperature and pressure (T and P) are generally assumed to be fixed. The variation with respect to T and P is addressed in the calibration section below. Also, $\epsilon_i$ are only species dependent, and are independent of $C_i$. At a reference wavelength $\lambda_r$, it may be noted that:

$$\eta_{fr} = \hat{\eta}_f(C, \lambda_r) \quad (6)$$

$$\eta_{\kappa r} = \hat{\eta}_\kappa(\lambda_r) \quad (7)$$

Note that $C = \{C_l, C_h, C_c\}$. As per the assumption discussed above, $C_c$ has no or minimal influence on attenuation at wavelength $\lambda_r$ and $\lambda_R$. Similar to $\lambda_r$, at $\lambda_R$:

$$\eta_{fR} = \hat{\eta}_f(C, \lambda_R) \quad (8)$$

$$\eta_{\kappa R} = \hat{\eta}_\kappa(\lambda_R) \quad (9)$$

Adsorption due to species $CO_2$ occurs at measurement wavelength $\lambda_m$. At this wavelength:

$$\eta_{fm} = \hat{\eta}_f(C, \lambda_m) \quad (10)$$

$$\eta_{\kappa m} = \hat{\eta}_\kappa(\lambda_m) \quad (11)$$

For molar attenuation coefficient, along the lines of notations of refractive indices, with subscripts denoting the component and the wavelength:

$$\epsilon_{lr} = \hat{\epsilon}_l(\lambda_r) \quad (12)$$

$$\epsilon_{hr} = \hat{\epsilon}_h(\lambda_r) \quad (13)$$

$$\epsilon_{cr} = \hat{\epsilon}_c(\lambda_r) \quad (14)$$

$$\epsilon_{lR} = \hat{\epsilon}_l(\lambda_R) \quad (15)$$

$$\epsilon_{hR} = \hat{\epsilon}_h(\lambda_R) \quad (16)$$

$$\epsilon_{cR} = \hat{\epsilon}_c(\lambda_R) \quad (17)$$

$$\epsilon_{lm} = \hat{\epsilon}_l(\lambda_m) \quad (18)$$

$$\epsilon_{hm} = \hat{\epsilon}_h(\lambda_m) \quad (19)$$

$$\epsilon_{cm} = \hat{\epsilon}_c(\lambda_m) \quad (20)$$

As in the case of refractive indices, it is to be understood that the above quantities will vary with temperature and pressure, although in liquid state, pressure dependence is expected to be relatively weak.

At the wavelengths $\lambda_r$, $\lambda_R$, and $\lambda_m$, the source (e.g., incident) intensities are $I_{0r}$, $I_{0R}$, and $I_{0m}$. The totally reflected beam is attenuated as per the dictates of Beer-Lambert law, and these measured intensities at the corresponding wavelengths, at $I_r$, $I_R$, and $I_m$. If we let $\beta$ represent the wavelength subscripts r, R, and m, an expression applicable for all wavelengths of interest and within the applicability of Beer-Lambert law is:

$$A_{e\beta} = \quad (21)$$
$$\ln\frac{I_\beta}{I_{0\beta}} = \sum_{i=l,h,c} \epsilon_{i\beta} C_i \hat{\ell}(\eta_{f\beta}, \eta_{\kappa\beta}, \theta) = \sum_{i=l,h,c} \epsilon_{i\beta} C_i \hat{\ell}_{\kappa\beta}(C, \theta) = \epsilon_{i\beta} C_i \hat{\ell}_{\kappa\beta\theta}(C).$$

where we note that $\hat{\ell}_{\kappa\beta\theta}: C \to 1$ through $\eta_f$ and $\eta_\kappa$, and the path length variation with respect to wavelength and incident angle are captured in the subscripts $\beta$ and $\theta$. The subscript $\kappa$ for referring to crystal takes on a value that varies with the material, for example, d for diamond, s for sapphire, or § for zirconia. To distinguish the crystals, notations $\kappa_1$ for crystal 1, $\kappa_2$ for crystal 2, and so on if there are more than two crystals, may be used.

Source Calibration

The intensity $I_{0\beta}$ is fixed by the source temperature $T_0$. Even if the fluid chamber is evacuated, so that there is no absorption, the measured optical intensity would not show the expected variation with respect to $T_0$ and would not be identical from one sensor to the next. This variation from the expected Planck's black body spectral radiance of (h and k are the Planck's and Boltzmann constants):

$$I_0(\lambda) = \frac{2hc^2}{\lambda^5 \left(e^{\frac{hc}{\lambda \kappa T_0}} - 1\right)}. \tag{22}$$

may be due to a number of factors including filter and detector variability, and may be remedied by setting suitable gains in the measurement system. Since the sensor should have an adequate span over the expected range of data, calibration in vacuum would lead to saturating the measurement. Therefore, a suitable liquid whose E; is known at various temperatures of the liquid and whose refractive index is in the middle of the expected range is ideal.

For source intensity gain and intensity tuning called normalization, consider the sensor crystal 42 exposed to the known fluid sample 44. As per the dictates of Eq. 22, the expected source intensity at $\lambda_R$ and $\lambda_m$ for a source temperature fixed at $T_0$ may be written as:

$$\frac{I_{0R}}{I_{0r}} = f(T_0, \lambda_r, \lambda_R) \tag{23}$$

$$\frac{I_{0m}}{I_{0r}} = f(T_0, \lambda_r, \lambda_m) \tag{24}$$

Obviously, $f(T_0; \lambda_r; \lambda_r)=1$. The molar attenuation coefficient of the normalization fluid may be denoted with a subscript z. Then, for the normalization fluid, the ATR response for a sensor with $N_R$ total internal reflections is:

$$\frac{I_{zr}}{I_{0r}} = e^{-\epsilon_{zr} N_R \ell_{zr}} \tag{25}$$

$$\frac{I_{zR}}{I_{0r}} = e^{-\epsilon_{zR} N_R \ell_{zr} R} \tag{26}$$

$$\frac{I_{zm}}{I_{0r}} = e^{-\epsilon_{zm} N_R \ell_{zm}}. \tag{27}$$

Now, since the refractive index of the crystal 42 and the normalization fluid are known, the effective path length is known (see further below). Thus, the right hand side of the above equations may be computed. Since $I_{zr}$ is measured, Eq. 25 leads to:

$$I_{0r} = I_{zr} e^{-\epsilon_{zr} N_R \ell_{zr}}$$

From the measured $I_{0r}$, $I_{zr}$, and $I_{zm}$, and Eqs. 23-27, the gains may be set so that:

$$I_{zR} = f(T_0, \lambda_r, \lambda_R) I_{zr} e^{N_R(\epsilon_{zr}\ell_{zr} - \epsilon_{zR}\ell_{zR})} \tag{28}$$

$$I_{zm} = f(T_0, \lambda_r, \lambda_m) I_{zr} e^{N_R(\epsilon_{zr}\ell_{zr} - \epsilon_{zm}\ell_{zm})}. \tag{29}$$

If the above responses are satisfied through appropriate gain adjustment, then the ratios of Eq. 23 and 24 are met for all sensors, and it may be assumed that these relationships hold post-normalization.

Penetration Depth

The ATR technology is based on measuring the change in the intensity of a totally internally reflected infrared beam when it passes through the interface of the sensor (i.e., crystal 42) and the fluid sample 44. This is given in terms of the attenuation of the reflected beam intensity when compared to the incident beam. The implementation of ATR technology should satisfy two necessary conditions for total internal reflection. These are that:

The refractive index of the crystal 42 be greater than that of the fluid sample 44 at all wavelengths over the measurement range.

The incident angle of the beam be larger than the critical angle at the crystal-sample interface.

The amplitude of the internally reflected wave at the crystal-sample interface is affected because the evanescent wave formed while undergoing total internal reflection penetrates the fluid sample 44 adjacent to the interface, and exponentially decays with the distance from the crystal-sample interface. The penetration depth is that distance over which the evanescent wave's intensity decays according to what would have occurred in transmission, and is approximately:

$$d_p = \frac{\lambda}{2\pi \hat{\eta}_\kappa(\lambda) \sqrt{\sin^2\theta - \left[\frac{\hat{\eta}_f(C, \lambda)}{\hat{\eta}_\kappa(\lambda)}\right]^2}}. \tag{30}$$

In a strongly absorbing medium, the interaction between the probing light beam and the medium should be sufficiently small to ensure that measurements are not entirely attenuated. The correct depth or what is preferably termed as the effective path length is better quantified by considering perpendicular and parallel polarization and taking their mean value.

Since the path length of the evanescent wave is a fraction of a µm, ATR is a powerful technique for obtaining dissolved $CO_2$ in brine and crude oil downhole. The prerequisite is that the predominant species should be the molecular $CO_2$ and not a derivative species. If configured to have multiple reflections, the cumulative depth of penetration may be used to compute l, the optical path length of the sensor, approximately equal to $N_R d_e$, where $N_R$ is the number of reflections and $d_e$ is the effective path length, and is set equal $K d_p$ as explained below.

It is assumed that the effective path length of the mid-IR is equal to $K d_p$, as described above. Parallel and perpendicular polarized waves undergo differing evanescent path lengths, and K computed as a result of both attenuations is the variable that corrects $d_p$ to $d_e$. Thus, the effective path length is:

$$l = K N_R d_p, \tag{31}$$

where K varies with $\eta_f$, $\eta_\kappa$, and $\theta$. Variation of $\eta_f$ or $\eta_\kappa$ with respect to $\lambda$ implies that K changes with $\lambda$. For that matter, it varies with concentration vector C of the dissolved species also. This leads to:

$$K = \hat{K}(\hat{\eta}_f(C,\lambda), \hat{\eta}_\kappa(\lambda), \theta) = \bar{K}(C, \lambda, \theta). \tag{32}$$

Again, the functional dependence is for a fixed temperature and pressure. $N_R$ is the number of reflections that is determined by the design of the crystal-fluid interface. Note that for $\eta_\kappa$, the subscript κ is used to denote the material. For example, K may be d for diamond, s for sapphire, ξ for zirconia. For the fluid refractive index, a subscript s may be added to f in order to emphasize that the measurement is on a solution whose component is desired.

For intensities that are measured, the first subscript is denoted as s to indicate the solution whose dissolved component is desired to be estimated, whereas the second subscript refers to the wavelength. The third subscript refers to the crystal number. Each crystal number may have a different material of construction and/or a different θ.

With crystal one, the measured absorbance (in ln scale) at $\lambda_r$ is thus denoted $A_{er1}$, and with crystal two, it is $A_{er2}$. Then:

$$A_{er1} = -\ln\frac{I_{sr1}}{I_{0r}} = \sum_{i=l,h,c}\epsilon_i C_i \ell_{sr1} = \sum_{i=l,h,c}\epsilon_i C_i \hat{\ell}(\eta_{f_sr}, \eta_{\kappa_1 r}, \theta_1) \quad (33)$$

$$A_{er2} = -\ln\frac{I_{sr2}}{I_{0r}} = \sum_{i=l,h,c}\epsilon_i C_i \ell_{sr2} = \sum_{i=l,h,c}\epsilon_i C_i \hat{\ell}(\eta_{f_sr}, \eta_{\kappa_2 r}, \theta_1) \quad (34)$$

The ratio of absorbance of the two crystals 42 is:

$$\frac{A_{er1}}{A_{er2}} = \frac{\hat{\ell}(\eta_{f_sr}, \eta_{\kappa_1 r}, \theta_1)}{\hat{\ell}(\eta_{f_sr}, \eta_{\kappa_2 r}, \theta_2)} = \quad (35)$$

$$\frac{N_R \hat{d}_e(\eta_{f_sr}, \eta_{\kappa_1 r}, \theta_1)}{N_R \hat{d}_e(\eta_{f_sr}, \eta_{\kappa_2 r}, \theta_2)} = \frac{\dfrac{\hat{d}_e(\eta_{f_sr}, \eta_{\kappa_1 r}, \theta_1)}{\hat{d}_p(\eta_{f_sr}, \eta_{\kappa_1 r}, \theta_1)}}{\dfrac{\hat{d}_e(\eta_{f_sr}, \eta_{\kappa_2 r}, \theta_2)}{\hat{d}_p(\eta_{f_sr}, \eta_{\kappa_2 r}, \theta_2)}} \cdot \frac{\hat{d}_p(\eta_{f_sr}, \eta_{\kappa_1 r}, \theta_1)}{\hat{d}_p(\eta_{f_sr}, \eta_{\kappa_2 r}, \theta_2)}.$$

D is defined as:

$$D = \frac{d_e}{d_p} = \hat{D}(\eta_f, \eta_\kappa, \theta). \quad (36)$$

For practical purposes, then, D=K. Then:

$$\frac{A_{er1}}{A_{er2}} = \frac{\hat{D}(\eta_{f_sr}, \eta_{\kappa_1 r}, \theta_1)}{\hat{D}(\eta_{f_sr}, \eta_{\kappa_2 r}, \theta_2)} = \frac{\hat{d}_p(\eta_{f_sr}, \eta_{\kappa_1 r}, \theta_1)}{\hat{d}_p(\eta_{f_sr}, \eta_{\kappa_2 r}, \theta_2)} \quad (37)$$

The results may be normalized with respect to a reference. In certain embodiments, the functions $\hat{D}$ at a $\eta_f = \eta_{min} = 1.3$ are used as the reference, although 1.325 may be used as well. Accordingly:

$$D_{r10} = \hat{D}_0(\eta_{\kappa_1 r}, \theta_1) = \hat{D}(\eta_{\kappa_1 r}, \eta_{min}, \theta_1) \quad (38)$$

$$D_{r20} = \hat{D}_0(\eta_{\kappa_2 r}, \theta_2) = \hat{D}(\eta_{\kappa_2 r}, \eta_{min}, \theta_2) \quad (39)$$

Further normalization of $D_{r10}$ and $D_{r20}$ may be carried out assuming a fixed refractive index for the fluid sample 44 and the crystal 42. The additional normalization construction of a function that varies only with the refractive index of the fluid sample 44, assumed independent of 2. However, the embodiments described herein are far more elaborate because of variability in refractive indices with respect to λ in the material of the crystal 42 and the fluid sample 44. To this end, Eq. 37 may be rewritten as:

$$\frac{A_{er1}}{A_{er2}} = \frac{D_{r10}}{D_{r20}}\frac{\hat{D}(\eta_{f_sr}, \eta_{\kappa_1 r}, \theta_1)}{D_{r10}} \frac{D_{r20}}{\hat{D}(\eta_{f_sr}, \eta_{\kappa_2 r}, \theta_1)}\frac{\hat{d}_p(\eta_{f_sr}, \eta_{\kappa_1 r}, \theta_1)}{\hat{d}_p(\eta_{f_sr}, \eta_{\kappa_2 r}, \theta_2)} \quad (40)$$

In addition:

$$\hat{D}_N(\eta_{f_sr}, \eta_{\kappa_1 r}, \theta_1) := \frac{\hat{D}(\eta_{f_sr}, \eta_{\kappa_1 r}, \theta_1)}{D_{r10}} \quad (41)$$

$$\hat{D}_N(\eta_{f_sr}, \eta_{\kappa_2 r}, \theta_2) := \frac{\hat{D}(\eta_{f_sr}, \eta_{\kappa_2 r}, \theta_2)}{D_{r20}} \quad (42)$$

Note that the denominator's numerical value for the crystal index is matched to that of the numerator. Also, note that by definition, the ratio $D_{r10} = D_{r20}$ is independent of $\eta_f$. A second normalization enables removal of the dependency on $\eta_\kappa$ and θ. For this:

$$\hat{D}_{NN}(\eta_f, \eta_\kappa, \theta) = \quad (43)$$

$$\hat{D}_N(\eta_f, \eta_\kappa, \theta)\left[1 + \hat{F}\left(\frac{\eta_\kappa}{\eta_s}\right)\left(\frac{\eta_\kappa}{\eta_s} - 1\right)\left(\frac{\eta_f - \eta_{min}}{\eta_{max} - \eta_{min}}\right)^{3/2}\right] \approx \tilde{G}(\eta_f; \lambda) = \tilde{G}(\eta_f; \eta_s)$$

where $F = \hat{F}(\eta_\kappa/\eta_s)$ is a function of the ratio of the refractive indices of the crystal 42 to that of sapphire at λ, and $\eta_{max}$ is the maximum value of $\theta_f$ for the normalization, set equal to 1.475 in this illustration. The range of 1.3 of 1.475 for $\theta_f$ covers most of fluids of interest. The function $\tilde{G}(\eta_f, \lambda)$ implies that for each λ, $\hat{D}_{NN}$ may be sufficiently well represented by a function of $\eta_f$. Essentially, the dependence on λ arises due to $\eta_s$ variation with respect to λ and the second crystal's η variation has been removed through the normalization process. It is, therefore, more appropriate to represent this dependence through G ($\eta_f$; $\eta_s$). This representation has an advantage that it reflects the more natural dependence, and the temperature variation is captured through $\eta_s$.

Numerical evidence of the above conjecture is presented below in a separate section on universality. Henceforth, $D_{NN} = \tilde{G}(\eta_f, \eta_s)$ will be used (i.e., the approximation is replaced with an equality). The equation above was tested at 350 K for λ in the range 2.5-4.5 μm with diamond and sapphire crystal properties. However, since the effective path length depends only on refractive indices, and not the material itself, it is believed that the conjecture is valid for other crystal materials whose refractive index is between that of diamond and sapphire (e.g., zirconia). At $\lambda_r$, $\eta_\kappa$ is replaced with $\eta_{\kappa r}$, and $\eta_s$ with $\eta_{sr}$, the refractive index of sapphire at the first reference wavelength.

The conjecture of Eq. 43 is important to processing of the measurements. It allows us to rewrite Eq. 40 in the form:

$$\frac{A_{er1}}{A_{er2}} = \frac{D_{r10}}{D_{r20}}\frac{\hat{D}_{NN}(\eta_{f_sr}, \eta_{\kappa_1 r}, \theta_1)}{\hat{D}_{NN}(\eta_{f_sr}, \eta_{\kappa_2 r}, \theta_2)} \quad (44)$$

$$\frac{1 + \hat{F}\left(\dfrac{\eta_{\kappa_2 r}}{\eta_{sr}}\right)\left(\dfrac{\eta_{\kappa_2 r}}{\eta_{sr}} - 1\right)\left(\dfrac{\eta_{f_sr} - \eta_{min}}{\eta_{max} - \eta_{min}}\right)^{3/2}}{1 + \hat{F}\left(\dfrac{\eta_{\kappa_1 r}}{\eta_{sr}}\right)\left(\dfrac{\eta_{\kappa_1 r}}{\eta_{sr}} - 1\right)\left(\dfrac{\eta_{f_sr} - \eta_{min}}{\eta_{max} - \eta_{min}}\right)^{3/2}} \frac{\hat{d}_p(\eta_{f_sr}, \eta_{\kappa_1 r}, \theta_1)}{\hat{d}_p(\eta_{f_sr}, \eta_{\kappa_2 r}, \theta_2)}$$

With the conjecture that $\hat{D}_{NN}(\eta_f, \eta_\kappa, \theta) = \hat{G}(\eta_f; \eta_s)$, the above equation simplifies to:

$$\frac{A_{er1}}{A_{er2}} = \frac{D_{r10}}{D_{r20}} \frac{1 + \hat{F}\left(\frac{\eta_{\kappa_2}r}{\eta_{sR}}\right)\left(\frac{\eta_{\kappa_2}r}{\eta_{sR}} - 1\right)\left(\frac{\eta_{f_s}r - \eta_{min}}{\eta_{max} - \eta_{min}}\right)^{3/2}}{1 + \hat{F}\left(\frac{\eta_{\kappa_1}r}{\eta_{sR}}\right)\left(\frac{\eta_{\kappa_1}r}{\eta_{sR}} - 1\right)\left(\frac{\eta_{f_s}r - \eta_{min}}{\eta_{max} - \eta_{min}}\right)^{3/2}} \frac{\hat{d}_p(\eta_{f_s r}, \eta_{\kappa_1 r}, \theta_1)}{\hat{d}_p(\eta_{f_s r}, \eta_{\kappa_2 r}, \theta_2)} \quad (45)$$

Referring back to Eq. 30, Eq. 45 may be rewritten explicitly in terms of $\eta_{f_s r}$ as:

$$\frac{A_{er1}}{A_{er2}} = \frac{D_{r10}}{D_{r20}} \frac{1 + \hat{F}\left(\frac{\eta_{\kappa_2}r}{\eta_{sr}}\right)\left(\frac{\eta_{\kappa_2}r}{\eta_{sr}} - 1\right)\left(\frac{\eta_{f_s}r - \eta_{min}}{\eta_{max} - \eta_{min}}\right)^{3/2}}{1 + \hat{F}\left(\frac{\eta_{\kappa_1}r}{\eta_{sr}}\right)\left(\frac{\eta_{\kappa_1}r}{\eta_{sr}} - 1\right)\left(\frac{\eta_{f_s}r - \eta_{min}}{\eta_{max} - \eta_{min}}\right)^{3/2}} \sqrt{\frac{\eta_{\kappa_2 r}^2 \sin^2\theta_2 - \eta_{f_s r}^2}{\eta_{\kappa_1 r}^2 \sin^2\theta_1 - \eta_{f_s r}^2}}. \quad (46)$$

The left hand side of the above equation is the ratio of two absorbances and constitutes a measurement. On the right hand side, the first term is independent of $\eta_{f_s r}$, and it requires the geometry of the crystal 42, the crystal material and its refractive index at measurement conditions, all of which are known. The only unknowns in the second and third terms is $\eta_{f_s r}$; the functional description of $\hat{\epsilon}$ is given in the section on universality description. Satisfying Eq. 46 provides the solution for $\eta_{f_s r}$.

The same procedure may be carried out for reference wavelength $\lambda R$. For this wavelength, Eq. 46 is modified to read:

$$\frac{A_{er1}}{A_{er2}} = \frac{D_{R10}}{D_{R20}} \frac{1 + \hat{F}\left(\frac{\eta_{\kappa_2}R}{\eta_{sR}}\right)\left(\frac{\eta_{\kappa_2}R}{\eta_{sR}} - 1\right)\left(\frac{\eta_{f_s}R - \eta_{min}}{\eta_{max} - \eta_{min}}\right)^{3/2}}{1 + \hat{F}\left(\frac{\eta_{\kappa_1}R}{\eta_{sR}}\right)\left(\frac{\eta_{\kappa_1}R}{\eta_{sR}} - 1\right)\left(\frac{\eta_{f_s}R - \eta_{min}}{\eta_{max} - \eta_{min}}\right)^{3/2}} \sqrt{\frac{\eta_{\kappa_2 R}^2 \sin^2\theta_2 - \eta_{f_s R}^2}{\eta_{\kappa_1 R}^2 \sin^2\theta_1 - \eta_{f_s R}^2}}. \quad (47)$$

Eq. 47 may be solved to obtain $\eta_{f_s R}$. The measurement wavelength for the dissolved component is $\lambda_m$. Analogous to Eqs. 46 and 47:

$$\frac{A_{em1}}{A_{em2}} = \frac{D_{m10}}{D_{m20}} \frac{1 + \hat{F}\left(\frac{\eta_{\kappa_2}m}{\eta_{sm}}\right)\left(\frac{\eta_{\kappa_2}m}{\eta_{sm}} - 1\right)\left(\frac{\eta_{f_s}m - \eta_{min}}{\eta_{max} - \eta_{min}}\right)^{3/2}}{1 + \hat{F}\left(\frac{\eta_{\kappa_1}m}{\eta_{sm}}\right)\left(\frac{\eta_{\kappa_1}m}{\eta_{sm}} - 1\right)\left(\frac{\eta_{f_s}m - \eta_{min}}{\eta_{max} - \eta_{min}}\right)^{3/2}} \sqrt{\frac{\eta_{\kappa_2 m}^2 \sin^2\theta_2 - \eta_{f_s m}^2}{\eta_{\kappa_1 m}^2 \sin^2\theta_1 - \eta_{f_s m}^2}}. \quad (48)$$

Again, since the crystal refractive indices are known at $\lambda_m$, solving Eq. 48 from the measured ratio of absorbance, $\eta_{f_s m}$ may be obtained.

Determination of $\eta_{f_s}$ at other wavelengths may be carried out as long as it lies: between $\eta_{min}$ and $\eta_{max}$, and suitable filters and detectors are present within the sensor to carry out the measurements. Wavelength dependency of $\eta_f$ at the fluid's temperature may then be obtained.

Dual Sapphire Crystals

Rather than using two different crystal materials, in other embodiments, sapphire may be used for both crystals. The above results may be simplified for such a configuration. Eq. 46 becomes:

$$\frac{A_{er1}}{A_{er2}} = \frac{D_{r10}}{D_{r20}} \sqrt{\frac{\eta_{sr}^2 \sin^2\theta_2 - \eta_{f_s r}^2}{\eta_{sr}^2 \sin^2\theta_1 - \eta_{f_s r}^1}}. \quad (49)$$

An explicit solution for the fluid refractive index at $\lambda_r$ is:

$$\eta_{f_s r} = \eta_{sr} \sqrt{\frac{\sin^2\theta_2 - \frac{A_{er1}^2}{A_{er2}^2}\frac{D_{r20}^2}{D_{r10}^2}\sin^2\theta_1}{1 - \frac{A_{er1}^2}{A_{er2}^2}\frac{D_{r20}^2}{D_{r10}^2}}}. \quad (50)$$

Analogous solutions at other wavelengths are:

$$\eta_{f_s r} = \eta_{sR} \sqrt{\frac{\sin^2\theta_2 - \frac{A_{eR1}^2}{A_{eR2}^2}\frac{D_{R20}^2}{D_{R10}^2}\sin^2\theta_1}{1 - \frac{A_{eR1}^2}{A_{eR2}^2}\frac{D_{R20}^2}{D_{R10}^2}}}, \quad (51)$$

$$\eta_{f_s m} = \eta_{sm} \sqrt{\frac{\sin^2\theta_2 - \frac{A_{em1}^2}{A_{em2}^2}\frac{D_{m20}^2}{D_{m10}^2}\sin^2\theta_1}{1 - \frac{A_{em1}^2}{A_{em2}^2}\frac{D_{m20}^2}{D_{m10}^2}}}. \quad (52)$$

Identical Crystal Material

In certain embodiments, the two crystals 42 may be made of the same material (e.g., diamond or zirconia). When the crystal materials are the same, $\eta_\kappa 1 = 1 \times 2$ at each wavelength. Although the ratio $\eta_\kappa/\eta_s$ is not unity, the second term of Eqs. 46 to 48 is one. Therefore, Eqs. 50 to 52 may be used, with the appropriate $\eta$kp replacing $\eta$ss in the expressions. Eqs. 38 and 39 may be used for $D_{r10}$ and $D_{r20}$ with the appropriate refractive indices for the crystals 42.

Universality

Numerical evidence is now provided of the universality conjecture of Eq. 43 for $D_{NN}$ to be expressible in terms of functions G or Ĝ (see FIGS. 4-9). A wavelength was first chosen, with a range of 0, and $D_{NN}$ was computed. The value of F (given by the function f) that makes the plot universal was also found. All of the plots are illustrated for diamond and sapphire at a temperature of 350 K, but note that this is inconsequential, because only refractive indices enter the calculation. FIG. 4 illustrates that for two materials of different refractive indices at 2.5 μm, the double normalized non-dimensional path length can be overlain. A similar overlap is seen at 3 μm (FIG. 5). Additional plots in steps of 0.5 μm for λ are shown in FIGS. 6-8. The legend "Universal" curve is a quadratic least squares approximation for points using refractive indices of diamond and sapphire.

For each wavelength, the function F takes on a different value, and this is best expressed as a function of $\eta_\kappa/\eta_s$ since (i) sapphire is the reference and (ii) the ratio of $1/d_p$ has explicit dependence on λ removed. The function f is irrelevant when the crystal 42 is also made of sapphire since the multiplicative factor $\eta_\kappa/\eta_s - 1$ will make the product zero. In FIG. 9, the variation of F with respect to $\eta_\kappa/\eta_s$ is illustrated along with a least squares approximation. The small scatter of computed markers from the best-fit curve is due to the precision used in F, and has little material consequence.

Since F is known as a function of $\eta_\kappa/\eta_s$, for a given $\lambda$ and T, the argument of $\hat{\epsilon}$ is known. The curve of FIG. 9 gives F. For the temperature of interest, $\eta_\kappa$ is known for the materials used at a given $\lambda$. Since $D_{r10}$, $D_{r20}$, $D_{R10}$, $D_{R20}$, $D_{m10}$, and $D_{m20}$ are functions only of $\eta_\kappa$ at the wavelength of interest, and $\theta$, all quantities on the right hand side of Eqs. 46-48 are known except for $\eta r$, which may thus be determined from the ratio of two measurements represented by the left hand side.

Dissolved Component Concentration

For the purpose of this section, it is assumed that calibration has been carried out, and that the value of $\epsilon_{lr}$, $\epsilon_{hr}$, $\epsilon_{cr}$, $\epsilon_{lR}$, $\epsilon_{hR}$, $\epsilon_{cR}$, $\epsilon_{lm}$, $\epsilon_{hm}$, and $\epsilon_{cm}$ within the temperature and pressure ranges of interest is known. Thus, the functions in Eqs. 12-20 assume that temperature T and pressure P are parameters, not explicitly included. In other words, as an example, strictly, $\epsilon_{lr} = \hat{\epsilon}_{lr}(\lambda_r; T, P)$ where T and P have been dropped in Eq. 12.

In the section on calibration, it is illustrated how $\epsilon_l$, $\epsilon_h$, and $\epsilon_c$ may be determined and, thus, infer their parametric dependence on T and P, and functional dependence on $\lambda$. By design (dropping the parametric dependence), $\hat{\epsilon}c(\lambda_r)$ and $\hat{\epsilon}c(\lambda_R)$ are nearly zero compared to solvent.

Now, at $\lambda_r$ and $\lambda_R$, four measurements from two crystals 42 (or $2N_\kappa$ for $N_\kappa$ crystals 42) are known. However, one measurement at each wavelength is independent, since the other was needed for $\theta_f$ at each wavelength. Since the crystal 42 with the smaller $\theta$ will have a larger $d_e$, attenuation measurement from the small $\theta$ crystal 42 may be used. Letting $\theta_1 < \theta_2$, from Eq. 21 while recognizing that the design calls for $\epsilon_{cr}$, $\epsilon_{CR} = 0$:

$$A_{er1} = (\epsilon_{lrCl} + \epsilon_{hr}C_h)\hat{I}(\eta_{f_s r}, \eta_{\kappa_1 r}, \theta_1) \tag{53}$$

$$A_{eR1} = (\epsilon_{lR}C_l + \epsilon_{hR}C_h)\hat{I}(\eta_{f_s R}, \eta_{\kappa_1 R}, \theta_1) \tag{54}$$

Note that $\hat{I}$ is computable since all the three arguments are known. Provided the equations are linearly independent, $C_l$ and $C_h$ may be determined. It is possible that $\epsilon_{lr} = \epsilon_{hr}$ and $\epsilon_{lR} = \epsilon_{hR}$. If so, only the sum $C_l + C_h$ may be inferred, and the two equations have to be linearly dependent. In this unlikely case, during the calibration phase, it should be ensured that $\epsilon_{lm} = \epsilon_{hm}$ as well. Otherwise, l and h fractions at a molecular weight threshold should be distinguished so that $\epsilon_{lr} \approx \epsilon_{hr}$ and $\epsilon_{lR} \approx \epsilon_{hR}$.

It is not possible for concentrations to be negative. Thus, if either one is found to be less than 0, its value may be set to be zero, and an error flag may be set. Each equation above will produce two different values for the non-negative concentration. A suitable mean (e.g., arithmetic) value of the two will be used. For example, suppose that $C_l < 0$ from Eqs. 53 and 54. $C_l = 0$ may be set. Each of the above equations then produces a value for Ch, and these may be averaged in certain embodiments.

Once $C_l$ and $C_h$ are obtained from Eqs. 53 and 54, the measurement at $\lambda_m$ may be used to get the concentration of the dissolved component from:

$$C_c = \frac{1}{\epsilon_{cm}}\left(\frac{A_{em1}}{\hat{I}(\eta_{f_s m}, \eta_{\kappa_1 m}, \theta_1)} - \epsilon_{lm}C_l - \epsilon_{hm}C_h\right). \tag{55}$$

Note that $C_c \geq 0$. If not, $C_c = 0$ may be set, and an error flag may be set.

Optimal Concentration Estimation

For reducing noise in the output, a single measurement at wavelength $\lambda_r$ and $\lambda_R$ may not be the best option. For example, detector and signal processing noise in the measurements, or fluctuations or variations in temperature between two crystals 42 may cause unwanted errors in $C_l$, $C_h$, and $C_c$. It is desirable to increase the number of reference wavelengths and/or take several closely spaced measurements that are sufficiently well separated to be uncorrelated, but not so far apart to be influenced by changes in the stream of the fluid sample 44. As used herein, the term "optimal concentration" is intended to mean concentrations of the various components of the fluid sample 44 that minimize noise and other errors that are due to random fluctuations.

One method to process the data, and probably the easiest and fastest, is to infer $\eta r$, for each pair of first and second measurements at $\lambda_r$ and $\lambda_R$. Alternatively, if there are J sets having 3 J measurements, $\theta_f$ may be averaged and the mean value used. Under either case, $\eta_{f_s}$ is obtained prior to solving for the concentrations.

Consider having J such measurements of $A_{er1}$, $A_{eR1}$, $A_{em1}$, along with matched J results of $\eta_{f_s r}$, $\eta_{f_s R}$, and $\eta_{f_s m}$. Thus, there are 3J measurements, or/each of $A_{er1}$, $A_{er1}$, $A_{em1}$. For each of theseJ measurements, there is an inferred $\eta_{f_s}$. The unknowns are $C_l$, $C_h$, and $C_c$. {for each of the 3 J measurements is computed from $(\eta_{f_s}, \eta_{\kappa_1}, \theta)$ for $\lambda_r$, $\lambda_R$, and $\lambda_m$. Note that multiple measurements out of theJ sets may have the same temperature and, for these, $\epsilon_{lr}l$, $\epsilon_{hr}l$ are the same. The same is true for $\epsilon_{lR}l$, $\epsilon_{hR}l$, and time, $\epsilon_{hm}l$, and $\epsilon_{cm}l$, where l here is understood to be at the frequency associated with the attenuation coefficient. The coefficient matrix E consisting of these elements will be such that ET E will be a 3×3 matrix. Then $(E^T E)^{-1} E^T$ is the pseudoinverse and is a 3×3J matrix. The measurements will have random variations and, as stated before, it is a column matrix A of 3 J elements. The least square result for the column matrix C with elements $C_l$, $C_h$, and $C_c$ is $(E^T E)^{-1} E^T A$. Explicitly, the matrix elements are:

$$E = \begin{bmatrix} (\epsilon_{lr}\ell_{sr1})_{,1} & (\epsilon_{hr}\ell_{sr1})_{,1} & 0 \\ (\epsilon_{lR}\ell_{sR1})_{,1} & (\epsilon_{hR}\ell_{sR1})_{,1} & 0 \\ (\epsilon_{lm}\ell_{sm1})_{,1} & (\epsilon_{hm}\ell_{sm1})_{,1} & (\epsilon_{cm}\ell_{sm1})_{,1} \\ \vdots & \vdots & \vdots \\ (\epsilon_{lr}\ell_{sr1})_{,J} & (\epsilon_{hr}\ell_{sr1})_{,J} & 0 \\ (\epsilon_{lR}\ell_{sR1})_{,J} & (\epsilon_{hR}\ell_{sR1})_{,J} & 0 \\ (\epsilon_{lm}\ell_{sm1})_{,J} & (\epsilon_{hm}\ell_{sm1})_{,J} & (\epsilon_{cm}\ell_{sm1})_{,J} \end{bmatrix} \tag{56}$$

$$C = \begin{bmatrix} C_l \\ C_h \\ C_c \end{bmatrix} \tag{57}$$

$$A = \begin{bmatrix} (A_{er1})_{,1} \\ (A_{eR1})_{,1} \\ (A_{em1})_{,1} \\ \vdots \\ (A_{er1})_{,J} \\ (A_{eR1})_{,J} \\ (A_{em1})_{,J} \end{bmatrix}. \tag{58}$$

The least squares solution when the same $\eta_{f_s}$ is used for the entire set of J is:

$$C = \begin{bmatrix} \frac{\overline{A}_{eR1}\epsilon_{hr}\ell_{sr1} - \overline{A}_{er1}\epsilon_{hR}\ell_{sR1}}{(\epsilon_{hr}\ell_{sr1}\epsilon_{lR}\ell_{sR1} - \epsilon_{hR}\ell_{sR1}\epsilon_{lr}\ell_{sr1})} \\ \frac{-\overline{A}_{eR1}\epsilon_{lr}\ell_{sr1} + \overline{A}_{er1}\epsilon_{lR}\ell_{sR1}}{(\epsilon_{hr}\ell_{sr1}\epsilon_{lR}\ell_{sR1} - \epsilon_{hR}\ell_{sR1}\epsilon_{lr}\ell_{sr1})} \\ \overline{A}_{eR1}(\epsilon_{hr}\ell_{sr1}\epsilon_{lm}\ell_{sm1} - \epsilon_{hm}\ell_{sm1}\epsilon_{lr}\ell_{sr1}) + \\ \overline{A}_{er1}(\epsilon_{hm}\ell_{sm1}\epsilon_{lR}\ell_{sR1} - \epsilon_{hR}\ell_{sR1}\epsilon_{lm}\ell_{sm1}) + \\ \frac{\overline{A}_{em1}(\epsilon_{hR}\ell_{sR1}\epsilon_{lr}\ell_{sr1} - \epsilon_{hr}\ell_{sr1}\epsilon_{lR}\ell_{sR1})}{\epsilon_{cm1}\ell_{sm1}(\epsilon_{hr}\ell_{sr1}\epsilon_{lR}\ell_{sR1} - \epsilon_{hr}\ell_{sR1}\epsilon_{lr}\ell_{sr1}} \end{bmatrix} \quad (59)$$

The averages of the J measurements are defined through:

$$\overline{A}_{eR1} = \frac{[(A_{eR1})_{,1} + \ldots + (A_{eR1})_{,J}]}{J} \quad (60)$$

$$\overline{A}_{er1} = \frac{[(A_{er1})_{,1} + \ldots + (A_{er1})_{,J}]}{J} \quad (61)$$

$$\overline{A}_{em1} = \frac{[(A_{em1})_{,1} + \ldots + (A_{em1})_{,J}]}{J} \quad (62)$$

An alternative easily applied option for real-time answers would be to take average temperature of the 2 J sets (from the two crystals), and compute $\eta$ for, $\eta_{f,R}$, and $\eta_{f,m}$. The averages of $A_{er1}$, $A_{eR1}$, $A_{em1}$ of the J sets may then be used in Eqs. 53, 54, and 55 to get $C_l$, $C_h$, and $C_c$. These provide an explicit best-fit solution from a set of J measurements comprising 3J attenuation data, and may also be applied on a rolling basis. When a J+1 set of three is added, set 1 is rolled off, and all sets are rolled up one level, and J+1 replaces J. This, then, provides a J-window moving average measurement.

In both of these cases, a moving set of J measurements, each consisting of 3 elements, may be used. The oldest set of points are rolled out of the dataset head to be replaced by a set of three new measurements at the tail end. J and $\Delta t$ (time for J measurements to be completed is J$\Delta t$) may be chosen such that within J$\Delta t$, noticeable change in concentrations are unlikely, and $\Delta t$ is large enough for the noise to be uncorrelated.

Eqs. 59 are based on J sets of measurements, for which a single value of $\eta_{f_s}$ is used for a given wavelength. While the equations provide the least squares solution to this problem, and is the same as inverting average of the/absorbances, there is no guarantee that no element of C is negative. If the wavelengths are chosen for the e matrix such that it is diagonally dominant, negative concentrations will be avoided. However, since light and heavy hydrocarbons are likely to have significant commonalities in the absorption spectrum, it is useful to have a method where only non-negative results are possible. Such a method may be a non-negative least squares algorithm. Although refinements to this algorithm are available, this algorithm is more than adequate. Alternatively, the non-negative least squares may be equivalent to a quadratic programming formulation of the form:

$$x:x = \arg\left[\min_{x_i \geq 0}\left(\frac{1}{2}x^T Q x + y^T x\right)\right], \quad (63)$$

where $Q = E^T E$ and $y = -E^T A$. The two methods should produce the same results.

Background Radiation

Unlike infrared (IR) wavelengths, mid-IR wavelengths are such that, at the temperatures of interest, a non-negligible spectral radiance occurs at the wavelengths of interest, particularly 3 μm and above, even for temperatures as low as 323 K.

One method for subtracting background radiation is to use the measured temperature, compute the spectral radiance and intensity based on Planck black-body radiation, and subtract the emission intensity from the measurement. Since the characteristics of the sensor and the filters come into play to make this correction properly, a look-up value of intensities for a temperature range of interest may be used. These look-up values may be tabulated based on actual measurement with a fluid, but without a source. However, the emissivity of fluids may vary, and such a correction may be prone to vary from one fluid to the next, or even with composition for a given hydrocarbon solvent. With brines, this is less of an issue, because the solubility of $CO_2$ in brine is sufficiently small that brine emissivity does not change appreciably.

For a more easily applied correction for a fluid of unknown emissivity, an on-off method may be implemented, the steps of which may include:

The source is on. Signal measured is a combination of the attenuate reflected intensity and the background. The measured signal at wavelengths $\lambda_r$, $\lambda_R$, and $\lambda_m$ for the solution adjacent to the crystal 42 may be labeled $S_{sr}$, $S_{sR}$, and $S_{sm}$.

The source is off. Signal measured is the background. The measured signal at wavelengths $\lambda_r$, $\lambda_R$, and $\lambda_m$ for the solution adjacent to the crystal 42 may be labeled $Z_{sr}$, $Z_{sR}$, and $Z_{sm}$.

Measurements used for calculating absorbances are $I_{sr} = S_{sr} - Z_{sr}$, $I_{sR} = S_{sR} - Z_s R$, and $I_{sm} = S_{sm} - Z_{sm}$.

Background subtraction may be applied for both crystals one and two.

Background subtraction may also be applied during calibration, as discussed below.

Crystal

For calibration and inversion of the measured intensities in terms of concentration, the refractive index of crystals 42 should not only be known at the temperature at the face exposed to the fluid sample 44, but also at each of the measurement wavelengths, including the reference. Given that the crystals 42 are relatively incompressible in comparison to the fluid samples 44, pressure dependency is likely to be of negligible consequence. As an example, sapphire shows a strong dependency over the wavelengths of interest (e.g., 2-5 μm) as exhibited in FIG. 10. The functionality is quadratic for $\eta_\kappa^2$ at least at 20° C. As illustrated in FIG. 11, $\eta_\kappa^2$ is nearly linear with respect to 12 over the range of wavelengths illustrated. A more elaborate computation that includes both temperature and wavelength dependence results is illustrated in the plot of FIG. 12. The temperature dependence is relatively weak compared to wavelength. The differences in $\eta_s$ at 2 μm and 4 μm are important enough for a $\eta_f$ measurement.

An alternative to sapphire is diamond, which has a higher refractive index and, therefore, allows for a smaller incidence angle for total internal reflection. FIG. 13 illustrates the square of diamond's refractive index with respect to the reciprocal of the square of the wavelength. In order to read the wavelength, the top axis shows the corresponding $\lambda$ values. Unlike sapphire, diamond's refractive index increases with wavelength, and is quite linear with respect to $1/\lambda^2$.

The correlations, the results of which are illustrated in FIGS. 12 and 13, allow inference of $\eta_\kappa$ at any of the wavelengths and at the temperatures of interest. Thus, based on the procedures given for calibration in the next section, the values of $\epsilon_{i\beta}$ may be inferred for the range of temperatures of interest, and over the limited range of pressures.

Calibration

In certain embodiments, calibration may be performed with two components l and h, thus dealing with the commonly encountered case of dissolution of $CO_2$ in crude oil. In other embodiments, more components than l and h may be added, but each addition would require an extra wavelength that provides nearly independent information, and this is not always possible given that hydrocarbons may be dominated by C—H bonds. It is also known that, at a minimum, composition evolution in developed miscibility requires two components. Furthermore, when the crude oil is represented by light and heavy components, the sampled hydrocarbon fluid in a $CO_2$ enhanced oil recovery process may change in composition with respect to the proportion of components l, h, and c, and it is desirable to estimate these.

Based on the foregoing, the calibration process may focus on tabulating $\epsilon_{lr}, \epsilon_{hr}, \epsilon_{lR}, \epsilon_{hR}, \epsilon_{lm}, \epsilon_{hm}, \epsilon_{cm}$ with respect to T and P. For aqueous media applications such as in aquifer storage of $CO_2$ or in beverage industry, the solvent does not need to be split up into l and h components; for such applications, the solvent may be represented by a single component and/may be understood to reflect the aqueous solvent within which $CO_2$ dissolves. Here, then, $C_h=0$.

The breakdown of a solvent into l and h fractions generally requires a cutoff. This may be based on the number of carbon atoms or molecular weight. The two are closely related since carbon is often the dominant contributor to molecular weight. Similar separation may be based on boiling point at a specified pressure. It may be preferable to use molecular weight as the criterion, since the concentrations of light and heavy components are known by simply measuring the mass density of the separated fractions at a given T and P.

In certain embodiments, the first step may be to take one of the fractions. Since only a very weak dependence of e on pressure is expected, a mean pressure value may be considered. If accuracy is of paramount importance, then a grid of temperatures and pressures may be constructed, and at each (T, P) pair, $\epsilon_{ir}, \epsilon_{iR}$, and $\epsilon_{im}$ may be obtained. For this, an ATR measurement may be conducted with the source turned on, and source turned off so as to obtain $I_r, I_R$, and $I_m$ after subtracting background radiation at each of the wavelengths. The background radiation may be checked against the measured temperature to see whether the relative magnitudes at $\lambda_r, \lambda_R$, and $\lambda_m$ correspond to the independent temperature measurement. If not, the calibration for $I_0$ may be rechecked. Assuming that this step is satisfactory, from the $I_r, I_R$, and $I_m$ values, applying Eq. 21, with $C_h$ and $C_c$ equal to zero, $\epsilon$ tr, $\epsilon_{iR}$, and $\epsilon$ lm are known. By repeating the process over the entire grid of (T, P), as densely as needed, functional variation of the attenuation coefficients may be obtained for the & component. For liquids, because these coefficients show negligible dependence on P, and are expected to have only small dependence on T, a least squares algorithm is likely to help alleviate concerns of experimental errors.

Repetition of the above procedure for component h enables generation of $\epsilon_{hr}, \epsilon_{hR}, \epsilon_{hm}$ expressions with respect to T and P.

Verification for Components l and h

Next, the values of $\epsilon_{lr}, \epsilon_{lR}, \epsilon_{lm}$, and $\epsilon_{hr}, \epsilon_{hR}, \epsilon_{hm}$ may be verified as adequate in inferring mixture composition of l and h. For this, masses $W_l$ and $W_h$ of the l and h components may be considered. With the molecular weights of the two components being $M_l$ and $M_h$, the number of moles of l and h in the mixture are:

$$n_l = \frac{W_l}{M_l}; n_h = \frac{W_h}{M_h}. \tag{64}$$

Starting with volumes $V_l$ and $V_h$ of the two components, since the final volume $V_{lh} \approx V_l + V_h$, an independent mixed volume measurement may be needed. The concentrations are $$C_l = \frac{n_l}{V_{lh}}; C_h = \frac{n_h}{V_{lh}}. \tag{65}$$

Thus, an attenuation experiment with a constituted mixture should provide correct values for $C_l$ and $C_h$ when the calibrated values of $\epsilon_l$ and $\epsilon_h$ are used at the three wavelengths for the T and P of interest. Conversely, the measured intensities should correspond to:

$$\frac{I_r}{I_{0r}} = e^{-(\epsilon_{lr}C_l + \epsilon_{hr}C_h)}; \frac{I_R}{I_{0R}} = e^{-(\epsilon_{lR}C_l + \epsilon_{hR}C_h)}; \frac{I_m}{I_{0m}} = e^{-(\epsilon_{lm}C_l + \epsilon_{hm}C_h)} \tag{66}$$

where $C_l$ and $C_h$ are obtained from Eqs. 65.

Calibration for Component c

For component c, the matter is not quite as straightforward, since $CO_2$ may be in gas or liquid states or supercritical at the conditions of T and P. Even at 100%, at low pressures, attenuation may be negligible. In addition, pure $CO_2$ may have a very large attenuation at high pressures. Therefore, the system may combine measurements with equilibrated $CO_2$ in a solvent, knowing the dissolved amount from thermodynamic data, and attenuation in gas-phase pure $CO_2$. It may also be necessary to vary the solvent, in certain situations. Whenever a solvent is used, pure solvent attenuation coefficient and the component concentrations in the mixture will be needed; the latter of which is known from thermodynamic solution data of $CO_2$ in the solvent. In this scenario, it may be useful to know n at least for a subset of the solutions or pure gas, for validation. The procedure with pure $CO_2$ and an aqueous solvent is illustrated herein. The method is equally applicable with other solvents. The solvent may be denoted with a subscript b. Thus, the concentration of the solvent for calibration is $C_b$ and its attenuation coefficient is $\epsilon_b$.

Based on attenuation experiments, a relatively rough scale for $\epsilon_c$ is about 100 m² mol⁻¹. This number may be used only for obtaining an estimate of the expected magnitude of attenuations for experimental design, and may not be used otherwise. For example, setting a 10% attenuation with a 1 µm path length (each reflection with sapphire, at 70°, gives an effective path length of about 0.44 µm at 350 K, with an $\eta_f$ of unity; at 75°, this drops to 0.32 µm), a minimum of approximately 2.29 MPa pressure at 298 K may be required. More appropriately, a concentration of 1053.6 mol m⁻³ may be needed to get $\epsilon_c$. By conducting attenuation experiments at various pressures and temperatures with pure $CO_2$, $\epsilon_c$ at wavelengths $\lambda_r$, $\lambda_R$, and $\lambda_m$ at each T and P may be obtained from:

$$\frac{I_r}{I_{0r}} = e^{-\epsilon_{cr} C_c}; \quad \frac{I_R}{I_{0R}} = e^{-\epsilon_{cR} C_c}; \quad \frac{I_m}{I_{0m}} = e^{-\epsilon_{cm} C_c}. \tag{67}$$

The minimum pressure as per the above assumptions is shown in FIG. 14 with open circles. Below this pressure, attenuation may be insufficient. As examples, at 273 K, a pressure of approximately 2.03 MPa is needed, and at 373 K a pressure of approximately 3.03 MPa is required. Above these pressures, attenuation is sufficient to infer $\epsilon_c$.

At relatively high pressures, attenuation in $CO_2$ may be too large and the sensor may be nearly saturated. The estimated $\epsilon_c$ with a saturated sensor will have an unacceptable error. Since $\epsilon_c$ is expected to have only very small variability with respect to P, we may choose to use the low pressure values as an approximation. An alternative is to consider high pressure $CO_2$ at vapor, gas and supercritical conditions. The calculations in FIG. 14 show the maximum pressure above which a liquid forms; at this transition, the sensor is oversaturated. The transition to liquid occurs below the critical temperature shown by a vertical dashed line. The solid circles otherwise show the maximum pressure above which attenuation is sufficiently strong to lose sensitivity to concentration. Thus, the approximate range of recommended pressures for calibration is the band between open and solid circles. If it is found that $\epsilon_c$ dependence on P is insignificant, pure $CO_2$ based calibration is sufficient.

If, for a certain range of temperature, it is found that $\epsilon_c$ dependence on P is relevant enough to be taken into account, an alternative would be to use attenuation measurements with dissolved $CO_2$ and thermodynamic data for calibration. The simplest of solvents to consider would be brine or water, the latter being preferable since solubility of $CO_2$ decreases with salt concentration. Using 1000 kg m$^{-3}$ as the approximate density of water over the range of T and P of interest, and a 3 µm effective path length (for $\eta_f=1.325$ and T=350 K, at an angle of 75°, per reflection effective length is about 0.89 µm; at 70°, this increases to 1.29 µm), an attenuation range of 0.1-0.9 may be set for estimating Ec. These lower and upper values gives ECCcl=0.10536 and 2.3026. For purposes of determining approximate bounds for minimum and maximum pressure, attenuation may be neglected due to solvent. Then, with {=3 µm and Ec=100 m$^2$ mol$^{-1}$, a molality of $CO_2$ between 0.3512 and 7.6533 in mol kg$^{-1}$ is calculated.

Based on thermodynamics based correlations for standard chemical potentials for $CO_2$ in water, fugacity coefficients, and the vapor pressure of water, molality of $CO_2$ in an aqueous solvent may be computed reasonably well for P and T ranges of interest. Calculated solubilities from these correlations are shown for different temperatures within a range of interest in FIG. 15. Since the equilibrated dissolved $CO_2$ is known to be dominated by species of $CO_2$ in liquid form, it may be used to set the range of pressures for which the attenuation is expected to be in the region of appreciable sensitivity. The minimum pressure required for molality to be 0.3512 mol kg-1 has been computed. The maximum pressure allowable is the transition to liquid below the critical temperature, since the thermodynamic model assumes vapor phase for $CO_2$. Above critical temperature of $CO_2$, the maximum pressure exceeds 20 MPa, and is not of concern. The minimum pressure of $CO_2$ required for calibration with a pure water solution has been added to the FIG. 14 result, and the combined plot is shown in FIG. 16.

Figure 17:
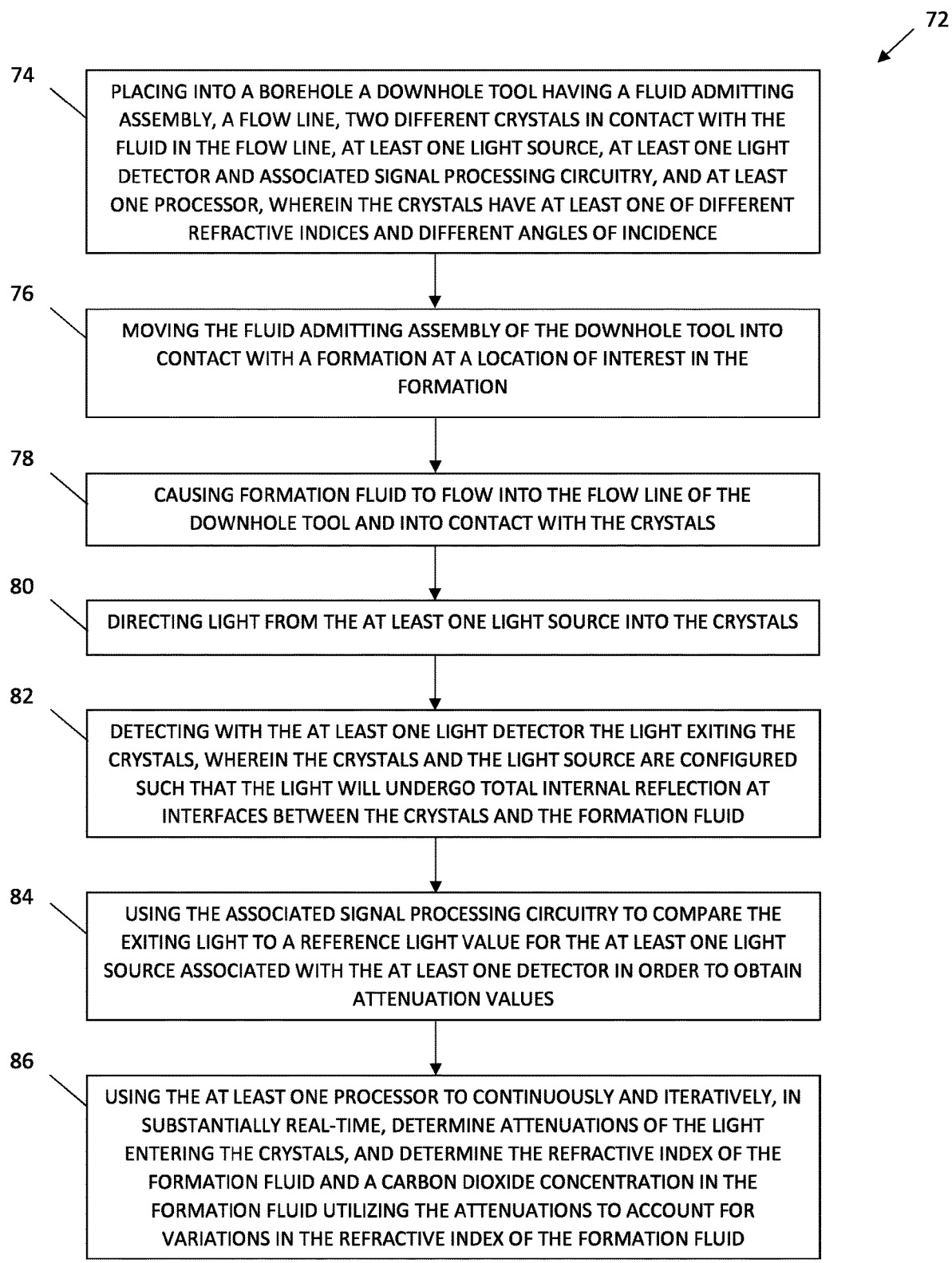
FIG. 17 is a flow diagram of a method for determining a refractive index of a formation fluid, in accordance with embodiments of the present disclosure.

FIG. 17 is a flow diagram of a method 72 for determining a refractive index of a formation fluid (e.g., the fluid sample 44 discussed with respect to FIG. 2). In certain embodiments, the method 72 includes placing into a borehole 12 a downhole tool 10 having a fluid admitting assembly 24, a flow line 30, two different crystals 42 in contact with the formation fluid 44 in the flow line 30, at least one light source 46, at least one light detector 52 and associated signal processing circuitry 54, and at least one processor 68, wherein the crystals 42 have at least one of different refractive indices and different angles of incidence (block 74). In addition, in certain embodiments, the method 72 includes moving the fluid admitting assembly 24 of the downhole tool 10 into contact with a formation 14 at a location of interest in the formation 14 (block 76). In addition, in certain embodiments, the method 72 includes causing formation fluid 44 to flow into the flow line 30 of the downhole tool 10 and into contact with the crystals 42 (block 78). In addition, in certain embodiments, the method 72 includes directing light from the at least one light source 46 into the crystals 42 (block 80). In addition, in certain embodiments, the method 72 includes detecting with the at least one light detector 52 the light exiting the crystals 42, wherein the crystals 42 and the at least one light source 46 are configured such that the light will undergo total internal reflection at interfaces between the crystals 42 and the formation fluid 44 (block 82). In addition, in certain embodiments, the method 72 includes using the associated signal processing circuitry 54 to compare the exiting light to an unattenuated (or reference) light value for the at least one light source 46 associated with the at least one detector 52 in order to obtain attenuation values (block 84). In addition, in certain embodiments, the method 72 includes using the at least one processor 68 to continuously and iteratively, in substantially real-time, determine attenuations of the light entering the crystals 42, and determine the refractive index of the formation fluid 44 and a carbon dioxide concentration in the formation fluid 44 utilizing the attenuations to account for variations in the refractive index of the formation fluid 44 (block 86).

As described above, in certain embodiments, once the at least one processor 68 determines the refractive index of the formation fluid 44 and the carbon dioxide concentration in the formation fluid 44, the at least one processor 68 may send control signals (e.g., via the communications interface 60) to the control systems 18, 22 illustrated in FIG. 1 to cause the control systems 18, 22 to control certain surface and/or downhole equipment to, for example, adjust component compositions of fluids that might be injected into the borehole 12 based at least in part on the determined refractive index of the formation fluid 44 and carbon dioxide concentration in the formation fluid 44.

The embodiments of the present disclosure include, but are not limited to:

A two crystal based attenuated total reflection measurement at more than one reference wavelength and an attenuation wavelength at which $CO_2$ attenuates an incident mid-IR beam.

A technique that takes into account the variation of refractive index at the wavelengths of acquisition, for inferring the fluid composition.

A normalization procedure for all sensors with a reference fluid so that with the tuned gain, all source intensities at the acquisition wavelengths appear the same to the detector.

A procedure that avoids background radiation correction through direct on-off method.

A calibration method for inferring the molar attenuation coefficients of the solvent components and the gas whose dissolved concentration is desired.

Estimate of attenuation coefficient varying with temperature and pressure.

An optimal component concentration estimate from a multitude of attenuation measurements at two or more wavelengths.

An algorithm that continuously estimates moving average optimal concentrations.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A tool for determining a refractive index of a formation fluid, comprising:
    a body having a fluid admitting assembly and a flow line that receives the formation fluid;
    two different crystals having faces in contact with fluid in the flow line, wherein the crystals comprise a first crystal and a second crystal, wherein the crystals have at least one of different refractive indices or different angles of incidence with respect to light directed to the crystals;
    at least one light source coupled to the crystals and configured to direct the light into the crystals, wherein the light has at least one wavelength, and wherein the wavelength, the refractive indices, and the angles of incidence are configured such that the light undergoes total internal reflection at interfaces between the crystals and the formation fluid;
    at least one light detector coupled to the crystals and configured to measure reflected light exiting the crystals; and
    at least one processor coupled to the at least one light detector, wherein the at least one processor is configured to continuously and iteratively, in substantially real-time:
        determine attenuations of the light entering the crystals;
        determine a crystal correction coefficient based on:
            a first ratio of a first refractive index of the first crystal to a reference refractive index at the at least one wavelength; and
            a second ratio of a second refractive index of the second crystal to the reference refractive index at the at least one wavelength, wherein the reference refractive index is between a third refractive index of diamond and a fourth refractive index of sapphire at the at least one wavelength;
        normalize the attenuations based at least in part on the crystal correction coefficient; and
        determine the refractive index of the formation fluid and a carbon dioxide concentration in the formation fluid utilizing the normalized attenuations to account for variations in the refractive index of the formation fluid.

2. The tool of claim 1, wherein the at least one processor is configured to determine the refractive index of the formation fluid utilizing the attenuations to account for variations in penetration depth.

3. The tool of claim 1, wherein the at least one processor is configured to determine the refractive index of the formation fluid at the temperature and pressure of the sampled fluid.

4. The tool of claim 1, wherein the at least one processor is configured to determine the refractive index of the formation fluid correcting for background radiation.

5. The tool of claim 1, wherein the at least one processor is configured to use a plurality of reference wavelengths to determine the refractive index of the formation fluid, wherein each reference wavelength of the plurality of reference wavelengths corresponds to a different attenuation coefficient of a component in the formation fluid.

6. The tool of claim 1, wherein the at least one processor is configured to normalize the attenuations based on a gain of the attenuations with respect to a reference fluid.

7. The tool of claim 1, wherein the at least one processor is configured to estimate optimal concentrations of components in the formation fluid.

8. The tool of claim 1, wherein the at least one processor is configured to verify light and heavy component concentrations in the formation fluid.

9. The tool of claim 1, wherein the two different crystals comprise different materials.

10. The tool of claim 1, wherein each of the crystals comprises diamond, sapphire, or zirconia.

11. The tool of claim 1, wherein the at least one processor is configured to normalize the attenuations based on the crystal correction coefficient based on a relationship between the attenuations and the crystal correction coefficient according to:

$$\left[1 + \hat{F}\left(\frac{\eta_k}{\eta_{ref}}\right)\left(\frac{\eta_k}{\eta_{ref}} - 1\right)\left(\frac{\eta_f - \eta_{min}}{\eta_{max} - \eta_{min}}\right)\right]$$

where $\hat{F}$ is the crystal correction coefficient, $\eta_k$ is the first refractive index of the first crystal or the second refractive index of the second crystal, $\eta_{ref}$ is the reference refractive index, $\eta_f$ is the refractive index of the formation fluid, Amin is a minimum refractive index for the normalization, and $\eta_{max}$ is a maximum refractive index for the normalization.

12. A method for determining a refractive index of a formation fluid, comprising:
    placing into a borehole a tool having a fluid admitting assembly, a flow line, two different crystals in contact with the formation fluid in the flow line, at least one light source, at least one light detector and associated signal processing circuitry, and at least one processor, wherein the crystals comprise a first crystal and a second crystal, wherein the crystals have at least one of different refractive indices or different angles of incidence with respect to light directed to the crystals;
    moving the fluid admitting assembly of the tool into contact with a formation at a location of interest in the formation;
    causing formation fluid to flow into the flow line of the tool and into contact with the crystals;
    directing the light from the at least one light source into the crystals;
    detecting with the at least one light detector the light exiting the crystals, wherein the crystals and the at least one light source are configured such that the light will undergo total internal reflection at interfaces between the crystals and the formation fluid;

using the associated signal processing circuitry to compare the exiting light to a reference light value for the at least one light source associated with the at least one detector in order to obtain attenuation values; and using the at least one processor to continuously and iteratively, in substantially real-time:
  determine attenuations of the light entering the crystals;
  determine a crystal correction coefficient based on:
    a first ratio of a first refractive index of the first crystal to a reference refractive index at the at least one wavelength; and
    a second ratio of a second refractive index of the second crystal to the reference refractive index at the at least one wavelength, wherein the reference refractive index is between a third refractive index of diamond and a fourth refractive index of sapphire at the at least one wavelength;
  normalize the attenuations based at least in part on the crystal correction coefficient;
  determine the refractive index of the formation fluid; and
  determine a carbon dioxide concentration in the formation fluid utilizing the normalized attenuations to account for variations in the refractive index of the formation fluid at measurement wavelengths and reference wavelengths.

13. The method of claim 12, comprising using the at least one processor to determine the refractive index of the formation fluid utilizing the attenuations to account for variations in penetration depth.

14. The method of claim 12, comprising using the at least one processor to determine the refractive index of the formation fluid at the fluid conditions of temperature and pressure.

15. The method of claim 12, comprising using the at least one processor to determine the refractive index of the formation fluid correcting for background radiation.

16. The method of claim 12, comprising using the at least one processor to use a plurality of reference wavelengths to determine the refractive index of the formation fluid, wherein each reference wavelength of the plurality of reference wavelengths corresponds to a different attenuation coefficient of a component in the formation fluid.

17. The method of claim 12, comprising using the at least one processor to estimate optimal concentrations of components in the formation fluid.

18. The method of claim 12, comprising using the at least one processor to verify light and heavy component concentrations in the formation fluid.

19. The method of claim 12, wherein the two different crystals are composed of different materials.

20. A tool for determining a refractive index of a formation fluid, comprising:
  two different crystals having faces in contact with fluid in a flow line, wherein the crystals comprise a first crystal and a second crystal, wherein the crystals have at least one of different refractive indices or different angles of incidence with respect to light directed to the crystals;
  at least one light source coupled to the crystals and configured to direct the light into the crystals;
  at least one light detector coupled to the crystals and configured to measure reflected light exiting the crystals; and
  at least one processor coupled to the at least one light detector, wherein the at least one processor is configured to continuously and iteratively, in substantially real-time:
    determine attenuations of the light entering the crystals;
    determine a crystal correction coefficient based on:
      a first ratio of a first refractive index of the first crystal to a reference refractive index at the at least one wavelength; and
      a second ratio of a second refractive index of the second crystal to the reference refractive index at the at least one wavelength, wherein the reference refractive index is between a third refractive index of diamond and a fourth refractive index of sapphire at the at least one wavelength;
    normalize the attenuations based at least in part on the crystal correction coefficient; and
    determine the refractive index of the formation fluid and a carbon dioxide concentration in the formation fluid utilizing the normalized attenuations to account for variations in the refractive index of the formation fluid.

* * * * *